US007438264B2

(12) United States Patent  (10) Patent No.: US 7,438,264 B2
Cepollina et al.  (45) Date of Patent: Oct. 21, 2008

(54) METHOD AND ASSOCIATED APPARATUS FOR CAPTURING, SERVICING AND DE-ORBITING EARTH SATELLITES USING ROBOTICS

(75) Inventors: Frank J. Cepollina, Annandale, MD (US); Richard D. Burns, Annapolis, MD (US); Jill M. Holz, Laurel, MD (US); James E. Corbo, Columbia, MD (US); Nicholas M. Jedhrich, Annapolis, MD (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 86 days.

(21) Appl. No.: 11/670,781

(22) Filed: Feb. 2, 2007

(65) Prior Publication Data

US 2007/0125910 A1  Jun. 7, 2007

Related U.S. Application Data

(62) Division of application No. 11/124,592, filed on May 6, 2005, now Pat. No. 7,240,879.

(51) Int. Cl.
*B64G 1/64* (2006.01)
(52) U.S. Cl. .................. 244/172.5; 244/158.6
(58) Field of Classification Search .............. 244/158.6, 244/172.4, 172.5, 158.4
See application file for complete search history.

(56) References Cited

U.S. PATENT DOCUMENTS 4,298,178 A  11/1981  Hujsak

| 5,421,540 A | 6/1995 | Ting |
| 6,484,973 B1 | 11/2002 | Scott |
| 6,491,256 B1 | 12/2002 | Wingo |
| 6,523,784 B2 | 2/2003 | Steinsiek et al. |

(Continued)

*Primary Examiner*—Timothy D Collins
(74) *Attorney, Agent, or Firm*—Matthew Johnston

(57) ABSTRACT

This invention is a method and supporting apparatus for autonomously capturing, servicing and de-orbiting a free-flying spacecraft, such as a satellite, using robotics. The capture of the spacecraft includes the steps of optically seeking and ranging the satellite using LIDAR; and matching tumble rates, rendezvousing and berthing with the satellite. Servicing of the spacecraft may be done using supervised autonomy, which is allowing a robot to execute a sequence of instructions without intervention from a remote human-occupied location. These instructions may be packaged at the remote station in a script and uplinked to the robot for execution upon remote command giving authority to proceed. Alternately, the instructions may be generated by Artificial Intelligence (AI) logic onboard the robot. In either case, the remote operator maintains the ability to abort an instruction or script at any time, as well as the ability to intervene using manual override to teleoperate the robot.

In one embodiment, a vehicle used for carrying out the method of this invention comprises an ejection module, which includes the robot, and a de-orbit module. Once servicing is completed by the robot, the ejection module separates from the de-orbit module, leaving the de-orbit module attached to the satellite for de-orbiting the same at a future time. Upon separation, the ejection module can either de-orbit itself or rendezvous with another satellite for servicing. The ability to de-orbit a spacecraft further allows the opportunity to direct the landing of the spent satellite in a safe location away from population centers, such as the ocean.

10 Claims, 27 Drawing Sheets

U.S. PATENT DOCUMENTS

| | | |
|---|---|---|
| 7,240,879 B1 | 7/2007 | Cepollina et al. |
| 7,293,743 B2 | 11/2007 | Cepollina et al. |
| 2002/0179775 A1 | 12/2002 | Turner |
| 2007/0125910 A1 | 6/2007 | Cepollina et al. |
| 2007/0138344 A1 | 6/2007 | Cepollina et al. |
| 2007/0164164 A1 | 7/2007 | Cepollina et al. |

| | | | | |
|---|---|---|---|---|
| HIGHLIGHTS: | Launch/LV Separation/Rate Null/Sun Acquisition/EM SA Deploy | | | |
| PHASE BEGINS: | T-0 | | Duration: | 2-3 Hours |
| PHASE ENDS: | HRV-H1 Sun-pointing and Power Positive | | | |
| INSERTION ALTITUDE: | ~540 km +/- 10 km (20 km below HST at time of mission) | | | |
| ATTITUDE: | Launch Vehicle Controlled -> Rate Null -> -H1 Sun Point | | | |
| EPS: | EM Array Retracted -> EM Array Deployed (excluding GA Panel)/DM Array Retracted<br>Battery Power- Only (up to 180 minutes) -> -H1 Sun Point | | | |
| DM OPS MODE:<br>EM OPS MODE: | Idle (breakwire-based) -> Safe -> Normal -> Standby<br>Safe -> Free Flight -> Idle | | | |
| GN & C: | Rate Damp -> Sun Search/Tracker-Based Attitude Determination -> -H1 Sun Point | | | |
| COMMUNICATIONS:<br>Shared { | HST S-Band (Pri) - NA<br>DM S-Band (Pri) - Rx 2 kpbs SSAF, Tx 2-8 kbps SSAR<br>EM S-Band (Pri) - Rx 2kbps SSAF, Tx 2-8 kbps SSAR<br>EM Ku-Band (Pri) - NA | | | |

FIG. 17A

| | |
|---|---|
| HIGHLIGHTS: | Normal Mode Transition/Thruster Checkout and Cal/HGA Deploy/Ku-band & Vision Checkout/RelNav Sensor Checkout/Redundant Hardware Checkout/GA Unstow & Checkout/GA Stow |
| PHASE BEGINS: | HRV -H1 Sun-Pointing and Power Positive    Duration: 14 Days |
| PHASE ENDS: | HRV Commisioning Complete |
| ATTITUDE: | Sun-Point |
| EPS: | EM Array Deployed (except GA Panel)/DM Array Retracted -H1 Sun-Point |
| DM OPS MODE: | Safe -> Normal -> Standby |
| EM OPS MODE: | Safe -> Free Flight -> Idle |
| GN & C: | Thruster Checkout & Calibration/Inertial Hold |
| COMMUNICATIONS: | HST S-Band (Pri) - NA |
| | DM S-Band (Pri) - Rx 2-16 kpbs SSAF, Tx 2-8 kbps SSAR |
| Shared { | EM S-Band (Pri) - Rx 2-16 kbps SSAF, Tx 2-8 kbps SSAR |
| | EM Ku-Band (Pri) - Tx 50 Mbps KSAR |

FIG. 18

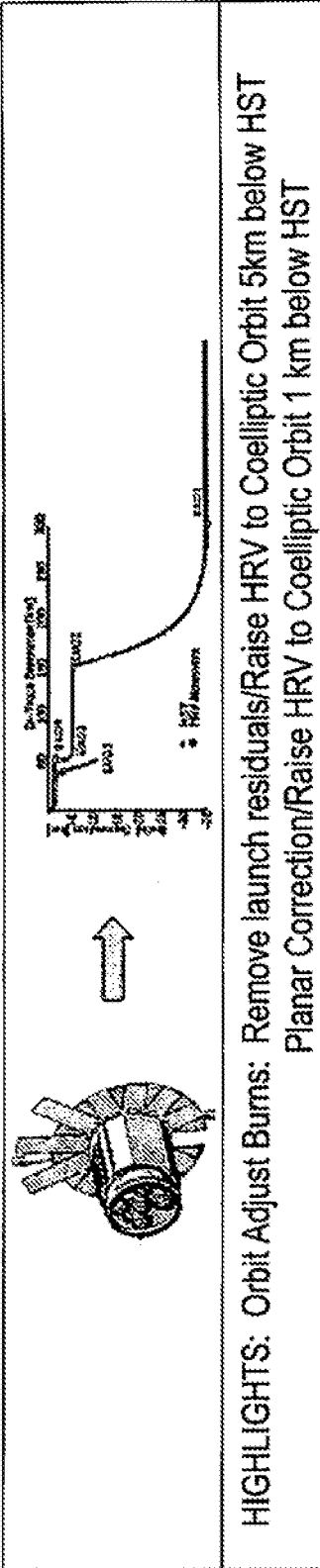

| | |
|---|---|
| HIGHLIGHTS: | Orbit Adjust Burns: Remove launch residuals/Raise HRV to Coelliptic Orbit 5km below HST<br>Planar Correction/Raise HRV to Coelliptic Orbit 1 km below HST |
| PHASE BEGINS: | HRV Commissioning Complete    Duration:  1-3 Days |
| PHASE ENDS: | HRV in Coelliptic Orbit just prior to the maneuver to the safety ellipse |
| ATTITUDE: | -H1 Sun-Point -> Burn (~15 minutes in altitude) -> -H1 Sun-Point (multiple times) |
| EPS: | EM Array Deployed (except GA Panel)/DM Array Retracted<br>-H1 Sun-Point -> Battery Power Only (~30 minutes) -> -H1 Sun-Point |
| DM OPS MODE: | Safe -> Normal -> Standby |
| EM OPS MODE: | Safe -> Free Flight -> Idle |
| GN&C: | Inertial Nav/Inertial Hold -> Slew -> Inertial Hold (burn ~31 sec max) -> Slew -> Inertial Hold (multiple X) |
| COMMUNICATIONS: | HST S-Band (Pri) - Rx 1 kbps SSAF, Tx 4 kbps SSAR<br>DM S-Band (Pri) - Rx 2-16 kpbs SSAF, Tx 2-8 kbps SSAR<br>EM S-Band (Pri) - Rx 2 kbps SSAF, Tx 2-8 kbps SSAR<br>EM Ku-Band (Pri) - Tx 50 Mbps KSAR |
| Shared ( | |

FIG. 19

| | |
|---|---|
| HIGHLIGHTS: | Enter Safety Ellipse about HST (150 km x 75km x 75 km)/RelNav Sensors periodically track HST for Position & Rate Determination/Perform Safety Ellipse Maintenance/Deploy GA (Pose for Approach Position) |
| PHASE BEGINS: | HRV Manuevers from Final Coelliptic Orbit to the safety Ellipse    Duration: 1-2 Days |
| PHASE ENDS: | Just Prior to Maneuver Away from the Final Safety Ellipse to Initiate Capture |
| ATTITUDE: | -H1 Sun-Point -> +H1 HST track (2 hours) -> -H1 Sun-Point |
| EPS: | EM Array Deployed (excluding GA Panel)/DM Array Retracted<br>-H1 Sun-Point -> Battery Power Only (2 hours) -> -H1 Sun-Point |
| DM OPS MODE: | Safe -> Normal -> Standby |
| EM OPS MODE: | Safe -> Free Flight -> Idle |
| GN&C: | Relative Nav/Sun-Point -> Slew -> +H3 HST Track (2 hours) -> Sun-Point (TBD frequency) |
| COMMUNICATIONS:<br>Shared { | HST S-Band (Pri) - Rx 1 kbps SSAF, Tx 4 kbps SSAR<br>DM S-Band (Pri) - Rx 2 kpbs SSAF, Tx 2-8 kbps SSAR<br>EM S-Band (Pri) - Rx 2 kbps SSAF, Tx 2-8 kbps SSAR<br>EM Ku-Band (Pri) - Tx 50 Mbps KSAR |

FIG. 20

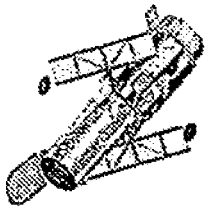

| | |
|---|---|
| HIGHLIGHTS: | Normal HST Science Operations/DM Quiescent Monitor Mode |
| PHASE BEGINS: | Ejection Complete    Duration: 4 Days |
| PHASE ENDS: | End of Science Operations and End of Life Testing |
| ATTITUDE: | Normal HST Science Attitudes |
| EPS: | DM Array Deployed- SA3 Taps Mated- HST Power System Augmented by DM |
| DM OPS MODE: | Safe -> Normal -> Standby |
| EM OPS MODE: | N/A |
| GN&C: | HST Standard Operations/DM Monitor Mode |
| COMMUNICATIONS: Shared { | HST S-Band (Pri) - Rx 1 kbps SSAF, Tx 32 kbps SSAR/MAR, Tx (SSR) 1 Mbps SSAR<br>DM S-Band (Pri) - Rx 2 kpbs SSAF, Tx 2-8 kbps SSAR<br>EM S-Band (Pri) - N/A<br>EM Ku-Band (Pri) - N/A |

FIG. 29

METHOD AND ASSOCIATED APPARATUS FOR CAPTURING, SERVICING AND DE-ORBITING EARTH SATELLITES USING ROBOTICS

RELATED APPLICATION

This application is a divisional application and claims the benefit of U.S. Non-provisional application Ser. No. 11/124,592, filed May 6, 2005 under 35 U.S.C. 121.

ORIGIN OF THE INVENTION

This invention was made by employees of the United States Government and contractors operating under a contract with the United States Government, and thus may be used by or for the Government for governmental purposes without the payment of any royalties thereon or therefor.

INCORPORATION BY REFERENCE

This application incorporates by reference U.S. Non-provisional application Ser. No. 11/124,592 filed May 6, 2005.

BACKGROUND OF THE INVENTION

1. Field of Invention

This invention relates generally to the field of man-made earth satellites and more specifically to a novel method and associated apparatus for capturing, servicing and de-orbiting such satellites.

2. Background of the Invention

The last half-century has been a watershed for the development and implementation of earth-orbit satellites for various purposes. Different types of earth satellites include those designed for communications, earth remote sensing, weather, global positioning, and scientific research. A typical example of a communications satellite might be EchoStar 3, which is used to send television signals to homes throughout North America. Communication satellites act as relay stations in space. They are used to "bounce" digital messages, such as telephone calls, television pictures and internet connections, from one part of the world to another. EchoStar 3 and many other communications satellites are in geosynchronous orbit. There are more than 100 such communication satellites currently orbiting earth.

Earth remote sensing satellites, such as the LandSat series (LandSat 1 through LandSat 7), study the earth's surface. From 300 miles above the earth's surface, and more, these satellites use powerful cameras to scan the planet. Their instruments study earth's plant cover, chemical composition, surface temperature, ice cap thicknesses, and many other earth systems and features. Such data is useful in vital industries such as farming, fishing, mining, and forestry. Moreover, remote sensing satellites are used to study changes in global environments caused by man. Examples of this include areas that are turning into desert (desertification), and the destruction of rain forests (deforestation).

TIROS (Television Infrared Observational Satellite), operated by NOAA (National Oceanic and Atmospheric Administration), is a representative weather satellite. TIROS is one of several weather satellites making up a system operated by NOAA, which produces data used to forecast weather, track storms, and otherwise engage in meteorological research. There are two TIROS satellites circling earth over the poles while satellites from another part of the system, the Geostationary Operational Environmental Satellites (GOES), operate in geosynchronous orbit. Using this system of satellites, meteorologists study the weather and climate patterns around the world, such as temperature, moisture, and solar radiation in the atmosphere. Also, many weather satellites are equipped with sensors that aid search and rescue operations.

The Global Positioning System (GPS) satellites are in geosynchronous orbit and are able to identify latitude, longitude and altitude with great precision. Originally developed by the military, GPS satellites are now used by a wide variety of people everywhere to find their exact position. Airplanes, boats, cars and virtually any transportation apparatus are equipped with GPS receivers. Even hand-held GPS devices have become a norm with pedestrians and other travelers.

While there are many examples of satellites engaged in scientific research, Hubble Space Telescope (HST) is perhaps the best known. Since 1990, when HST was launched, the world has had access to remarkable visual images that have significantly advanced our understanding of the cosmos. HST's optics, science instruments and spacecraft systems work together to capture light from far reaches of the universe, convert it into digital data, and transmit it back to earth. Because application of the current invention to HST represents an exemplary mode contemplated of carrying out the invention at the time of filing for a United States patent, an overview of HST's systems is appropriate. However, one skilled in the art will recognize that the method of this invention can be applied and adapted to virtually any man made earth satellite.

HST optics are collectively called the Optical Telescope Assembly (OTA), which includes two mirrors, support trusses and the apertures of the accompanying instruments. OTA's configuration is that of a well-known, straightforward design known as Ritchie-Chretien Cassegrain, in which the two specialized mirrors form focused images over the largest possible field of view. Referring now to FIGS. 1 through 5, HST and OTA are graphically illustrated. While FIG. 1 shows a three dimensional cutaway view of HST, FIGS. 2 and 3 specifically illustrate OTA and the principles of its operation. As best seen in FIG. 3, light enters through the main aperture and travels down a tube fitted with baffles that keep out stray light. The light is collected by the concave primary mirror and reflected toward the smaller, convex secondary mirror. The secondary mirror bounces the light back toward the primary mirror and through a smaller aperture in its center. The light is then focused on a small area called the focal plane, where it is detected by the various science instruments.

OTA's mirrors are necessarily very smooth and have precisely shaped reflecting surfaces. They were ground so that their surfaces do not deviate from a mathematically perfect curve by more than $1/800,000$ of an inch. According to this precision, if the primary mirror were scaled up to the diameter of the earth, the biggest bump would be only six inches tall. Shortly after HST was deployed, it was discovered that the curve to which primary mirror was ground was incorrect, causing a spherical aberration. Fortunately, corrective optics, much like a contact lens, were able to solve this problem.

The mirrors are made of ultra-low expansion glass and kept at a nearly constant room temperature (about 70 degrees Fahrenheit) to avoid warping. The reflecting surfaces are coated with a $3/1,000,000$-inch layer of pure aluminum and protected by a $1/1,000,000$-inch layer of magnesium fluoride, which makes the mirrors more reflective of ultraviolet light.

HST contains five science instruments, namely the Advanced Camera for Surveys (ACS), the Wide Field and Planetary Camera (WFPC2), the Near Infrared Camera and Multi-Object Spectrometer (NICMOS), the Space Telescope Imaging Spectrograph (STIS), and the Fine Guidance Sensors (FGS). These instruments work either together or individually to observe the universe in a unique way.

Installed in the latest space shuttle servicing mission in March of 2002, the ACS represents the third generation of science instruments flown aboard HST. It occupies the space vacated by the Faint Object Camera, HST's "zoom lens" for nearly twelve years. Among other tasks, ACS is used to map distribution of dark matter, detect the most distant objects in the universe, search for massive planets in other solar systems, observe weather on other planets in our solar system, and study the nature and distribution of galaxies. With its wider field of view, sharper image quality, and enhanced sensitivity, ACS expands HST's capabilities significantly; its cutting edge technology makes HST ten times more effective and prolongs its useful life. Designed to study some of the earliest activity in the universe, ACS detects electromagnetic waves in wavelengths ranging from far ultraviolet to infrared.

On the inside, ACS is actually a team of three different cameras, specifically the wide field camera, the high-resolution camera, and the solar blind camera. The wide field camera conducts broad surveys of the universe, which reveal clues about how our universe evolved. In contrast, the high-resolution camera takes detailed pictures of the inner regions of galaxies. The solar blind camera, which blocks visible light to enhance ultraviolet sensitivity, focuses on hot stars radiating in ultraviolet wavelengths.

HST's "workhorse" instrument, WFPC2, is behind most of the famous images it produces. This main camera includes 48 filters mounted on four filter wheels, which allow scientists to study precise wavelengths of light and to sense a range of wavelengths from ultraviolet to near-infrared light. Four postage stamp-sized pieces of circuitry called Charge-Coupled Devices (CCDs) collect and record information from stars and galaxies to make photographs. These detectors are very sensitive to the extremely faint light of distant galaxies. In fact, CCDs can see objects that are one billion times fainter than the human eye can see. Less sensitive CCDs are now found in some videocassette recorders and virtually all new digital cameras. Each of the four CCDs on HST contains 640,000 pixels. The light collected by each pixel is translated into a number. These numbers are then transmitted to ground-based computers, which convert them into an image.

NICMOS is HST's "heat sensor" and can see objects in deepest space—objects whose light takes billions of years to reach earth. The instrument's three cameras, each with different fields of view, are designed to detect near-infrared wavelengths, which are slightly longer than the wavelengths of visible light. Much information about the birth of stars, solar systems, and galaxies are revealed in infrared light, which can penetrate the interstellar dust and gas that often block visible light. In addition, light from the most distant objects in the universe "shifts" into the infrared wavelengths, and so by studying objects and phenomena in this spectral region, astronomers can probe the past, learning how galaxies, stars and planetary systems form.

Just as a camera for recording visible light must be dark inside to avoid exposure to unwanted light, so must a camera for recording infrared light be cold inside to avoid unwanted exposure to unwanted light in the form of heat. To ensure that NICMOS is recording infrared light from space rather than heat created by its own electronics, its sensitive infrared sensors must operate at very cold temperatures—below 77 degrees Kelvin (−321 degrees Fahrenheit). The instrument's detectors were initially cooled inside a cryogenic dewar (a thermally insulated container much like a thermos bottle), which contained a 230 pound block of nitrogen ice. While successful for about two years, the nitrogen ice cube melted prematurely. NICMOS was re-chilled during the last HST servicing mission of March 2002 with a "cryocooler," an apparatus that operates much like a household refrigerator.

STIS in essence acts like a prism to separate detected light into its component colors. This spectrograph instrument thus provides a "fingerprint" of the object being observed, which reveals information about its temperature, chemical composition, density and motion. Spectrographic observations also show changes in celestial objects as the universe evolves. STIS spans ultraviolet, visible and near-infrared wavelengths. Among other tasks, STIS is used to search for black holes. The light emitted by stars and gas orbiting the center of a galaxy appears redder when moving away from earth (redshift) and bluer when coming toward earth (blueshift). Thus, STIS looks for redshifted material on one side of the suspected black hole and blueshifted material on the other, indicating that this material is orbiting at a very high rate of speed, as would be expected when a black hole is present. STIS can sample 500 points along a celestial object simultaneously, meaning that many regions in planet's atmosphere or many stars within a galaxy can be recorded in one exposure. STIS was installed on HST during the 1997 shuttle servicing mission.

HST's Fine Guidance Sensors, its targeting cameras, provide feedback used to maneuver the telescope and perform celestial measurements. While two of the sensors point the telescope at a desired astronomical target, and then hold that target in an instrument's field of view, the third sensor is able to perform scientific observations. The FGS aim HST by locking onto "guide stars" and continuously measuring the position of the telescope relative to the object being viewed. Adjustments based on these constant, minute measurements keep HST pointed in the desired direction with an accuracy of 0.01 arcsec. The FGS detect when HST drifts even the smallest amount and return it to its target. This gives HST the ability to remain pointed at that target with no more than 0.007 arcsec of deviation over long periods of time. This level of stability and precision is the equivalent of being able to hold a laser beam focused on a dime 200 miles away for 24 hours.

Additionally, FGS provide precise astrometrical measurements of stars and celestial objects, which are advancing the knowledge of stars' distances, masses and motions. FGS provide star positions that are about ten times more accurate than those observed from ground-based telescopes. When used as science instruments, the sensors allow HST to search for a "wobble" in the motion of nearby stars, which may indicate that they have planets orbiting around them; determine if certain stars are actually double stars; measure the angular diameter of stars and other celestial objects; refine the positions and the absolute magnitude (brightness) scale for stars; and help determine the true distance scale for the universe.

All telescopes have optical systems, and some even have specialized instruments, but HST is almost unique in that it operates in space; the telescope is actually "flown" as a spacecraft. Therefore, several space craft systems are required to keep HST functioning smoothly. The essential systems are communications antennae, solar arrays for power, computers and automation, and housing.

HST performs only in response to detailed instructions from a ground-based control center, and thus communications antennae are necessary to transmit and receive such instructions between the telescope and the Flight Operations Team at the Space Telescope Science Institute. The four antennae on HST transmit and receive data via one of the constellation of Tracking and Data Relay Satellites (TDRS)

operated by NASA. In order for this system to be operational, at least one TDRS satellite must be visible within HST's line of sight. Direct interaction can occur between HST and the control center only when this line of sight exists. When none of the TDRS satellites are visible from HST, a recorder stores the accumulated data until visibility is resumed. A flow diagram of the communications process is provided as FIG. 4.

Flanking HST's tube are two thin, blue solar panel arrays. Each wing-like array has a solar cell "blanket" that converts the sun's energy directly into electricity to power HST's various systems. Some of the energy generated by the arrays is stored in onboard batteries so that HST can operate while traveling through earth's shadow (about 36 minutes out of each 97 minute orbit). Fully charged, each battery contains enough energy to sustain HST in normal science operations mode for 7.5 hours, or five orbits. The solar arrays are designed for replacement by visiting astronauts aboard a space shuttle.

In order to run all the many subsystems onboard HST, several computers and microprocessors reside in the body of HST, as well as in each science instrument. Two main computers, which girdle HST's "waist," direct all operations. One communicates with the instruments, receives their data and telemetry, sends the data to interface units for transmission to the ground, and sends commands and timing information to the instruments. The other main computer handles the gyroscopes, the pointing control sub-system, and other HST-wide functions. Each instrument itself also houses small computers and microprocessors that direct their activities. These computers direct the rotation of the filter wheels, open and close exposure shutters, maintain the temperature of the instruments, collect data, and communicate with the main computers.

In space, HST is subject to the harsh environment of zero gravity and temperature extremes—more than 100 degrees Fahrenheit difference in temperature during each trip around earth. To accommodate this operating environment, HST has a "skin," or blanket, of multilayered insulation, which protects the telescope during temperature shifts. Beneath this insulation is a lightweight aluminum shell, which provides an external structure for the spacecraft and houses the OTA and science instruments. The OTA is held together by a cylindrical truss made of graphite epoxy, the same material used to make many golf clubs, tennis racquets and bicycles. Graphite is a stiff, strong and lightweight material that resists expanding and contracting in extreme temperatures.

The following table summarizes some of the relevant facts about HST:

TABLE 1

| | |
|---|---|
| Weight | 24,500 Lbs. |
| Length | 43.5 Ft. |
| Diameter | 14 Ft. (Aft Shroud) |
| Optical System | Ritchey-Chretien Design Cassegrain Telescope |
| Primary Mirror | 94.5 Inch Dia. |
| Pointing Accuracy | 0.007 Arcsec for 24 Hours |
| Magnitude Range | 5 Meters to 30 Meters (Visual Magnitude) |
| Wavelength Range | 1,100 Angstroms to 24,000 Angstroms |
| Angular Resolution | 0.1 Arcsec at 6328 Angstroms |
| Orbit | 320 Nautical Miles Inclined at 28.5 Degrees |
| Orbit Time | 97 Minutes per Orbit |

As indicated by the foregoing narrative, HST was designed to be serviced and upgraded periodically throughout its lifetime. Specifically, as illustrated in FIGS. 5 and 6, the space shuttle program had planned missions dedicated to servicing and upgrading HST scheduled until 2010, at which time HST would be retired and de-orbited in favor of the new James Webb Space Telescope (JWST). However, in January of 2004, NASA Administrator Sean O'Keefe announced that he was canceling shuttle Service Mission 4 (SM4) because of safety issues identified by the Columbia Accident Investigation Board (CAIB) Report. The CAIB Report was issued as a result of the Space Shuttle Columbia disaster of Feb. 1, 2003, when all seven astronauts aboard Columbia were tragically killed on reentry into the atmosphere.

Administrator O'Keefe's announcement presented the scientific community with at least two problems. First, without SM4, regularly scheduled upgrades to HST's scientific instruments could not be made, thereby confining scientific use of HST to out-dated technology. Second, and of graver concern, without SM4, wearable parts on HST could not be replaced. More specifically, gyroscopes necessary for HST's Pointing Control System (PCS) are degrading and will probably cease to operate within the next three to five years, as indicated by the chart of FIG. 7. The current PCS requires sensing from three gyros, and already only four of the six gyros aboard HST are operational. Best estimates show that a less than 50 percent probability exists that three gyros will be operational by the late 2005 or early 2006. Although scientists are developing a two-gyro pointing system, that solution may add only 12 to 18 months of additional life.

Moreover, batteries that power HST's computers, instruments and virtually all vital systems are at risk. Based on recent tests, each of HST's six batteries is losing its charging capacity at a rate of 5.9 amp hours per year. This is far higher than previous tested loss rates of about two amp hours per year, and points out a tendency for capacity loss rate to accelerate nonlinearly over time. Without intervention, as scheduled by SM4, it is projected that by the end of 2005 science operations will likely require block scheduling and a lowering of the safemode trigger. By 2006, it is probable that the state-of-charge at the end of orbit night will be near the hardware sunpoint safemode trigger, which is the lowest level of safemode that protects the vehicle.

Accordingly, there is a need for a method and attendant apparatus for autonomously servicing HST and other free-flying satellites during flight using robotics.

BRIEF DESCRIPTION OF THE INVENTION

The problems and shortcomings experienced in the prior art, as detailed above and otherwise, are substantially alleviated by this invention, as will become apparent in the following recitation of the objects and brief description thereof.

One object of this invention is to provide servicing of satellites and other spacecraft without human presence on or near the spacecraft being serviced.

Another object is use the principle of supervised autonomy to control one or more aspects of a spacecraft servicing mission.

Still another object is to provide a method of de-orbiting a spacecraft that was not originally designed for de-orbit.

Accordingly, one method of the present invention comprises the nominal steps of autonomously establishing a link between a spacecraft needing servicing and a servicing vehicle, and sending commands to a robot system aboard the servicing vehicle, such commands addressing the servicing needs of the spacecraft. The commands may be pre-scripted or generated on board the servicing vehicle by using embedded Artificial Intelligence (AI) logic or other on board processing in response to sensed conditions. The robot system preferably comprises a grappling arm and a dexterous robot, which, in combination, provide for most servicing needs, such as replacing degraded batteries and upgrading the scientific capabilities of the spacecraft by replacing scientific instruments. The servicing vehicle may aid in other ways as well, such as by providing stowage area for replacement parts, by shielding the spacecraft from the harmful effects of the sun during servicing, and by boosting the altitude of the spacecraft's orbit by firing its thrusters.

Of course, one skilled in the art will appreciate that executing the commands effectuates the servicing procedure. Preferably, other such commands are also used and may include capturing the spacecraft to be serviced while still in free-flight by the robot system and providing the spacecraft with an ability to de-orbit.

Under the principle of supervised autonomy, the commands sent to the robot system can be overridden by a ground-based operator, who is in telecommunication with the servicing vehicle. In one embodiment, the remote operator may be ground based. In satellite. Use of modular design and construction of satellites and commonality among satellite designs can be used to maximize the potential repairability of future satellites. Constellations of substantially identical satellites, such as Iridium, GlobalStar and other communications satellites, stand to gain the greatest potential benefit of the repair capabilities of the present invention due to the use of common parts and their relative accessibility to repair vehicles due to their relatively low earth orbit.

Even for satellites in higher orbits, such as geostationary orbits, it may be more cost effective to conduct a robotic repair/servicing mission to extend the useful life of valuable communications and other satellite payloads presently on orbit, rather than to construct and launch entire replacement satellites. The use of the present invention also has the potential to reduce the amount of orbital debris in orbit by removing inoperative satellites from orbit.

In the geostationary band, it is generally considered cost-prohibitive to deorbit spent satellites, and satellites are generally boosted to a higher orbit that will not affect satellites in the geostationary band. Use of a repair mission in accordance with the present invention potentially could reduce the problem of clutter from spent satellites above geostationary orbit by extending the useful life of satellites and delaying their eventual boost to higher orbit. Even if it is necessary to boost the ejection module into higher-than-geostationary orbit, one such module may be used to service multiple geostationary satellites, resulting in a lower net contribution to the clutter in the higher-than-geostationary band.

One cause of end-of-life, particularly in geostationary satellites, is exhaustion of fuel used for stationkeeping and other maneuvers. Attaching a deorbit module to a geostationary satellite to provide for end-of-life boost above geostationary orbit can permit the use of fuel onboard the geostationary satellite for revenue producing purposes that was previously reserved (as required by international law and conventions) for the end-of-life boost maneuver. Exhaustion of fuel for attitude control thrusters may also cause a satellite to lose attitude control capability and thus reach the end of its useful life. In accordance with the present invention, it is possible for the servicing vehicle to transfer additional fuel to the target satellite for stationkeeping in the geostationary band or continued use of attitude control thrusters to allow it to extend its useful life.

The invention preferably also includes a method for capturing a free-flying spacecraft with a second free-flying spacecraft, the second spacecraft including the autonomous operation abilities already described. This method includes the steps of autonomously identifying and pursuing the second spacecraft and then securing the two spacecraft together. Preferably, the second spacecraft has a grappling arm or other device that aids in attaching the two spacecraft together, while the first spacecraft may have affixed berthing pins that facilitate attachment. One of skill in the art will recognize that a variety of docking mechanisms can be employed without departing from the scope of the present invention.

One skilled in the art may realize that the steps of autonomous identification and pursuit might be carried out by comparing file images of the first spacecraft with real time images taken continuously by the second spacecraft. Of course, in this situation the second spacecraft includes appropriate equipment to create images.

One method for capturing the spacecraft further includes the steps of launching the second spacecraft into space and establishing a link between the second spacecraft and a remote operator. Alternately, a second spacecraft previously launched and optionally used to conduct a prior servicing/deorbit mission can be directed to initiate pursuit, capture, and repair/deorbit of a target satellite, either from a parking orbit or directly from a first servicing rendezvous. In either case, the operator can use a communication link to the second spacecraft to override the autonomous identification and manual pursuit, and manually control the entire procedure or any part thereof as desired. Similarly, the step of securing the two spacecraft together can be done either autonomously or manually. If AI logic onboard the second spacecraft is used to conduct the autonomous pursuit, capture, and repair/de-orbit of the target satellite, the ground operator preferably may take manual control at any time either at his discretion or based on predetermined criteria. In addition, the second spacecraft may propose a particular action and await approval from the ground operator to execute that action depending on the inputs received by the AI logic or Authority to Proceed conditions either preset in the AI logic or directed by the ground operator.

Another method of this invention includes the steps of securing a de-orbit module to the spacecraft to be serviced and commanding the de-orbit module to de-orbit the spacecraft. For the purposes of the present invention, de-orbit includes both the removal of a spacecraft from orbit through reentry or transfer of a satellite to a disposal orbit, i.e. transferring a geostationary satellite to higher than geostationary orbit for disposal at end of life. One skilled in the art will appreciate that the de-orbit module allows for the flight path of the spacecraft to be controlled so that population centers can be avoided and impact can be targeted for an ocean or other desired location. If it is desired to de-orbit multiple satellites, a plurality of de-orbit modules can be transported by a single ejection module. Through sequential rendezvous and attachment of a de-orbit module followed by detachment of the ejection module, a plurality of satellites not originally designed for de-orbit can be provided with a de-orbit capability. Alternately, a satellite that has suffered a kick motor failure that prevented it from reaching its desired orbit similarly can have the faulty kick motor replaced with an operational replacement to permit the affected satellite to reach its design orbit.

DESCRIPTION OF THE DRAWINGS

In order that the claimed invention may be better made and used by those skilled in the art, and that the best mode of carrying out the invention may be more fully appreciated, the following drawings are provided, in which:

FIG. 17A is a chart summarizing the launch phase of a preferred method according to the present invention.

FIG. 18 is a chart summarizing the commissioning phase of an embodiment according to the present invention.

FIG. 19 is a chart summarizing the pursuit phase of an embodiment according to the present invention.

FIG. 20 is a chart summarizing the proximity operations phase of an embodiment according to the present invention.

FIG. 29 is a chart summarizing the science operations phase of an embodiment according to the present invention.

DETAILED DESCRIPTION

Figure 1:
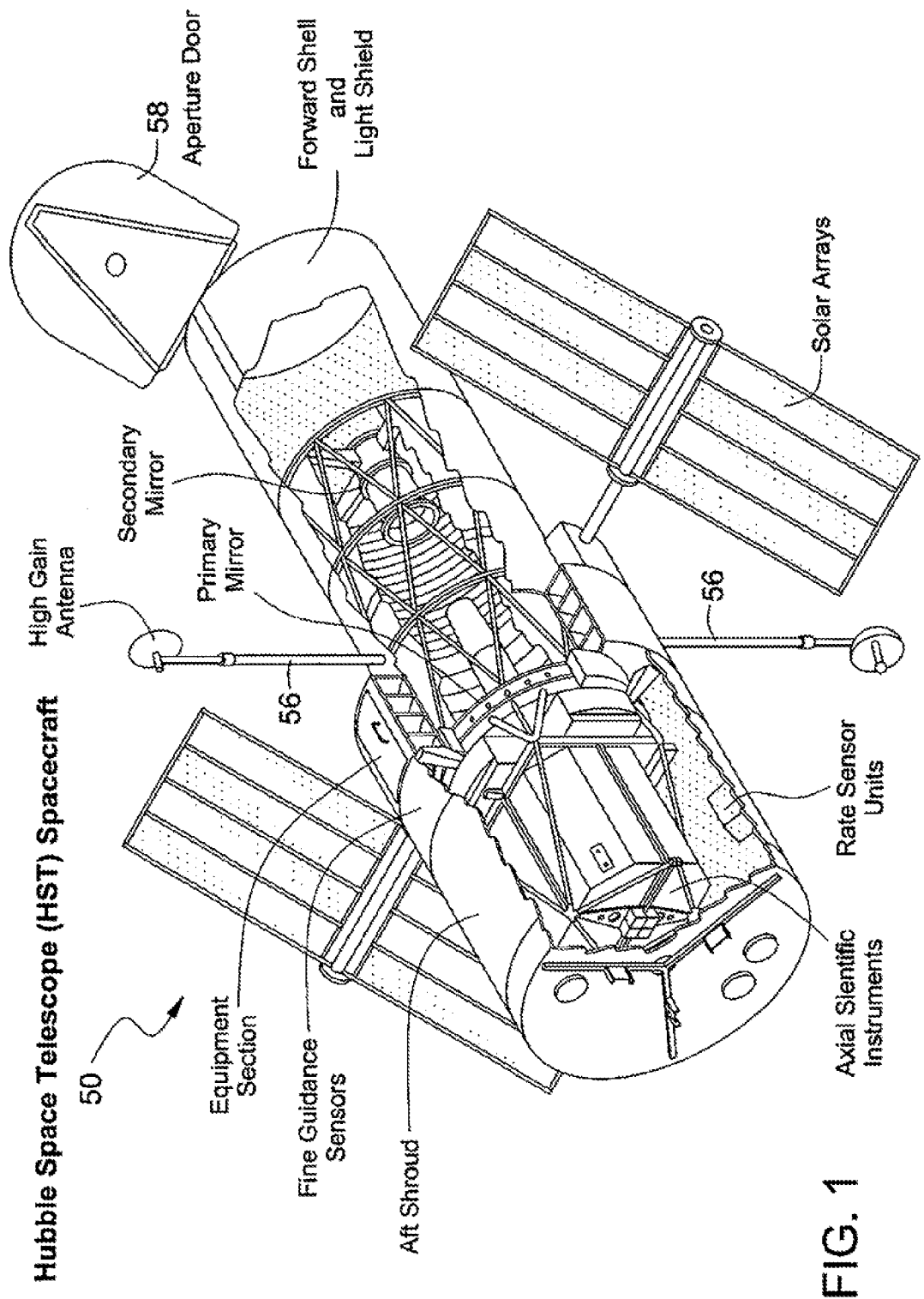
FIG. 1 is a cutaway three-dimensional perspective view of the Hubble Space Telescope (HST), illustrating major components and systems.
Figure 2:
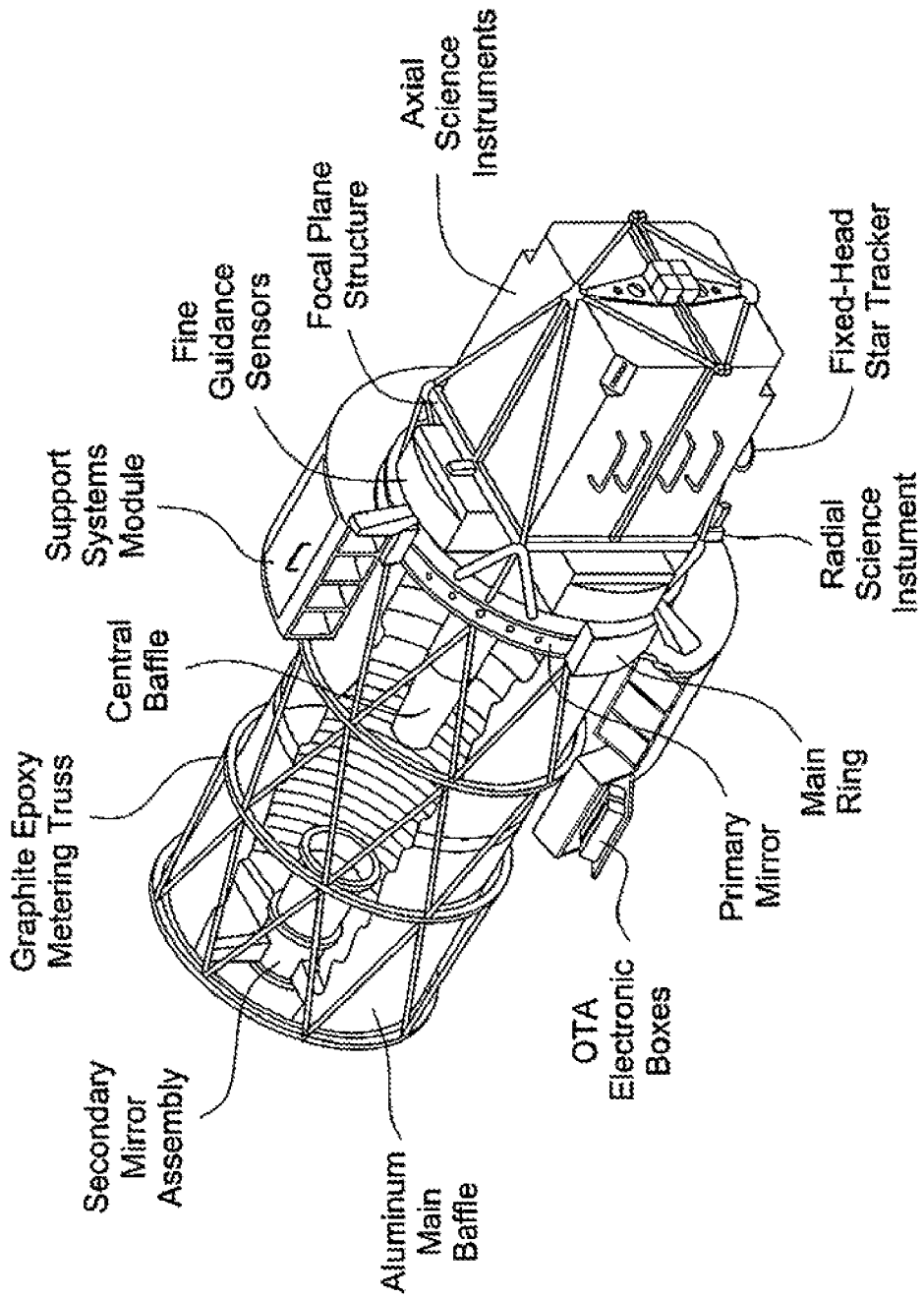
FIG. 2 is a cutaway three-dimensional perspective view of the Optical Telescope Assembly (OTA) of the HST.
Figure 3:
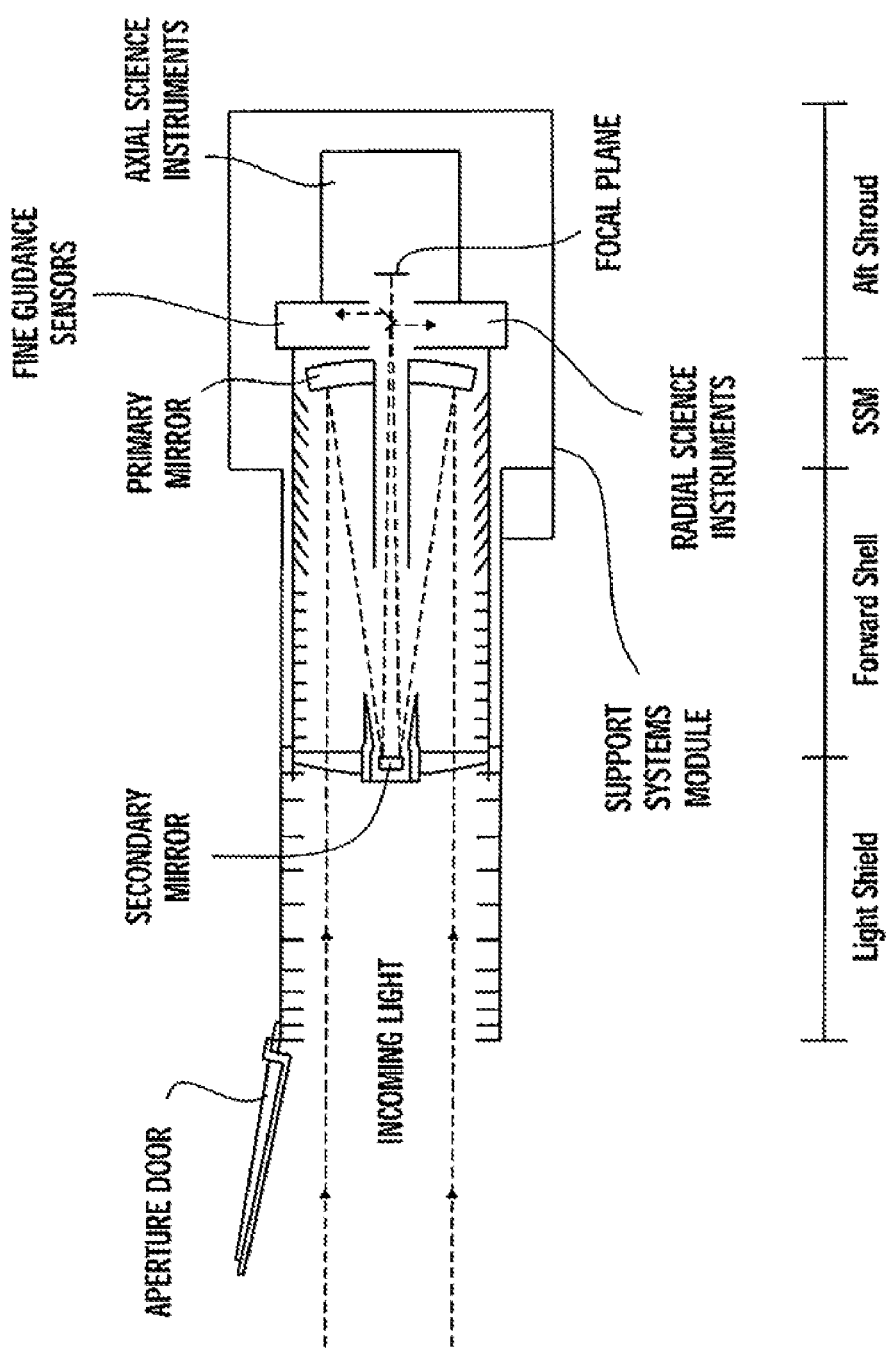
FIG. 3 is a side view of the OTA illustrating major components and the operation of the Ritchie-Chretien Cassegrain telescope design.
Figure 4:
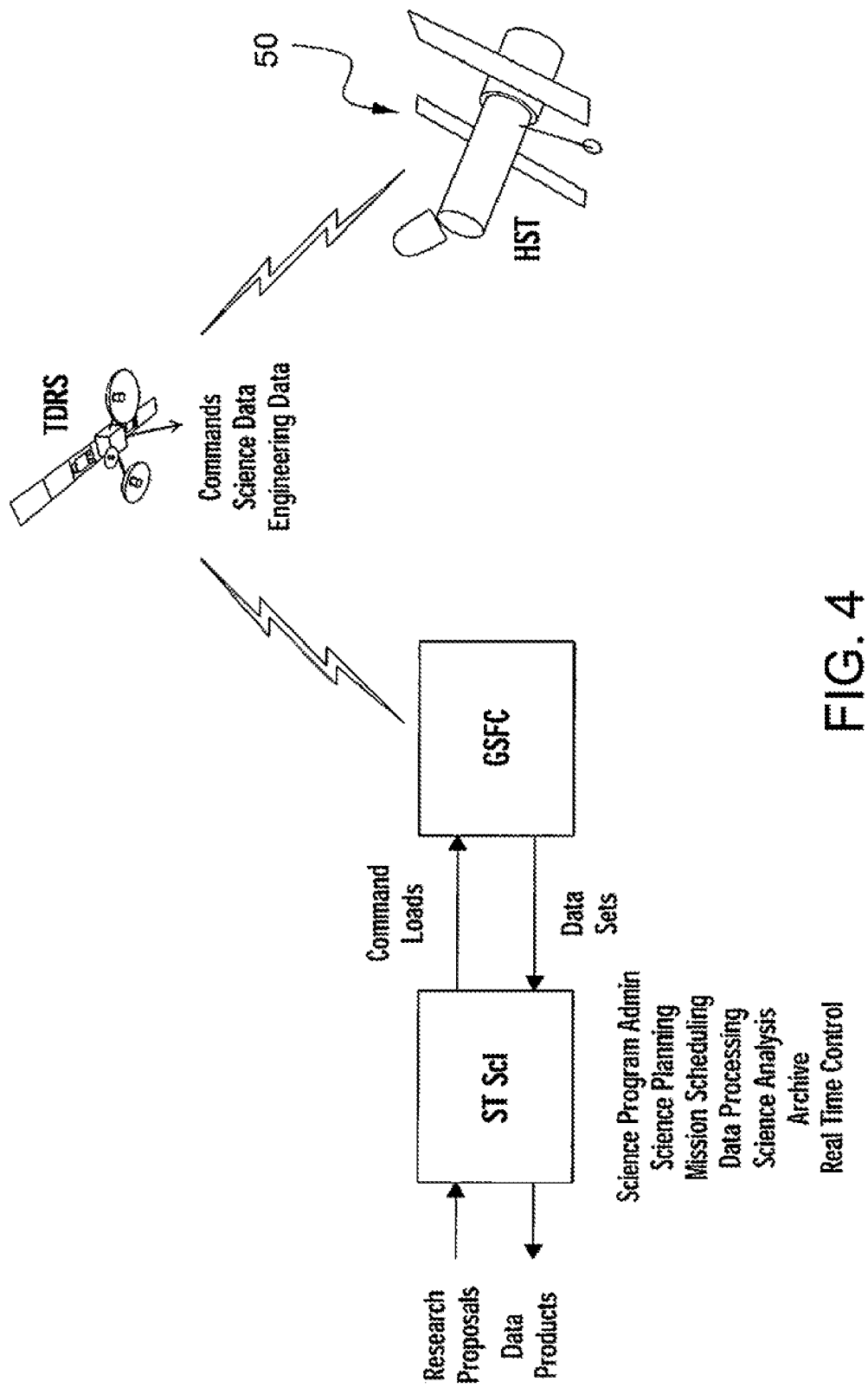
FIG. 4 is a schematic diagram showing the flow of data between HST and remote control centers.
Figure 5:
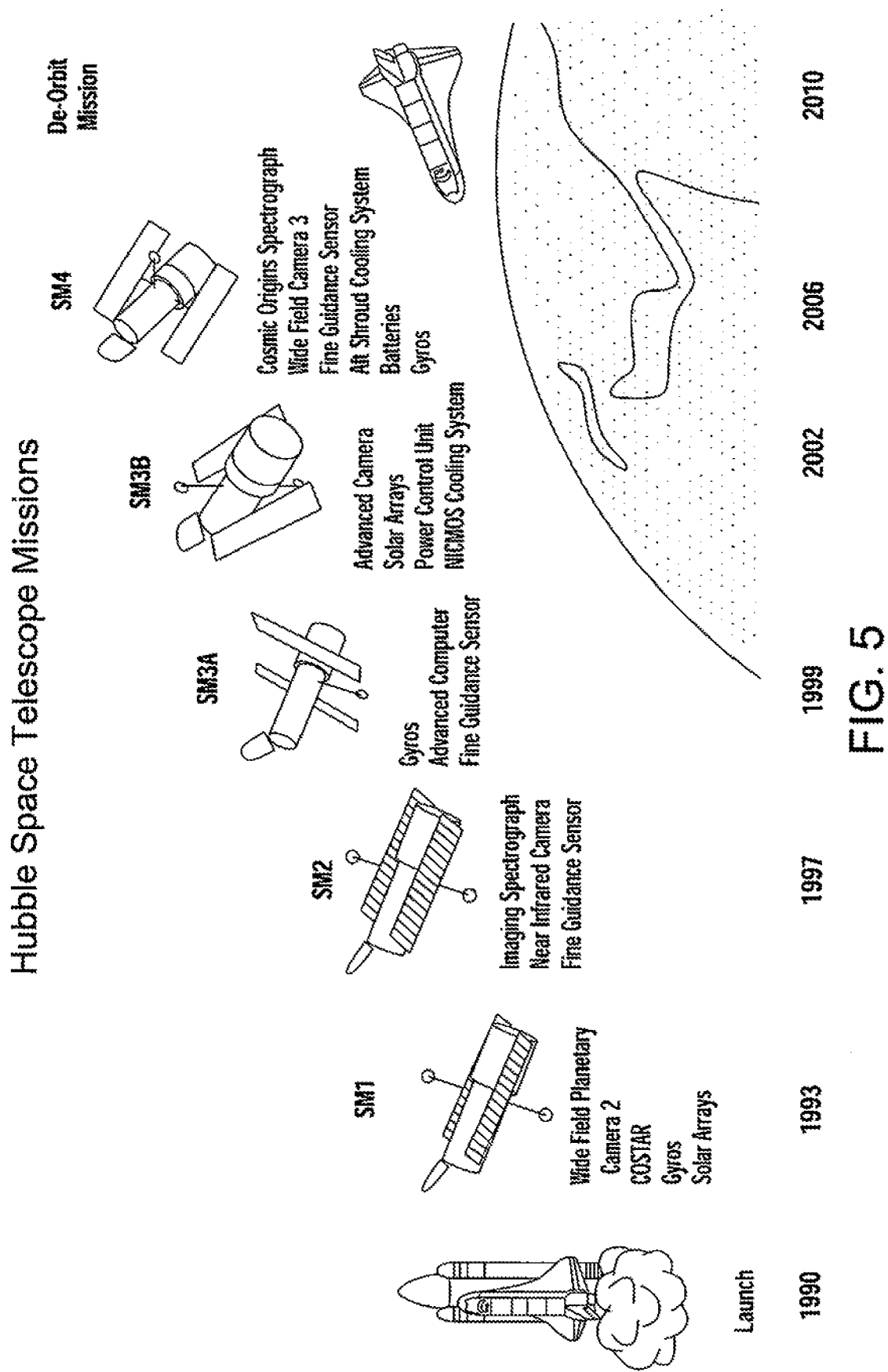
FIG. 5 is time chart showing the scheduled HST servicing missions by the space shuttle.
Figure 6:
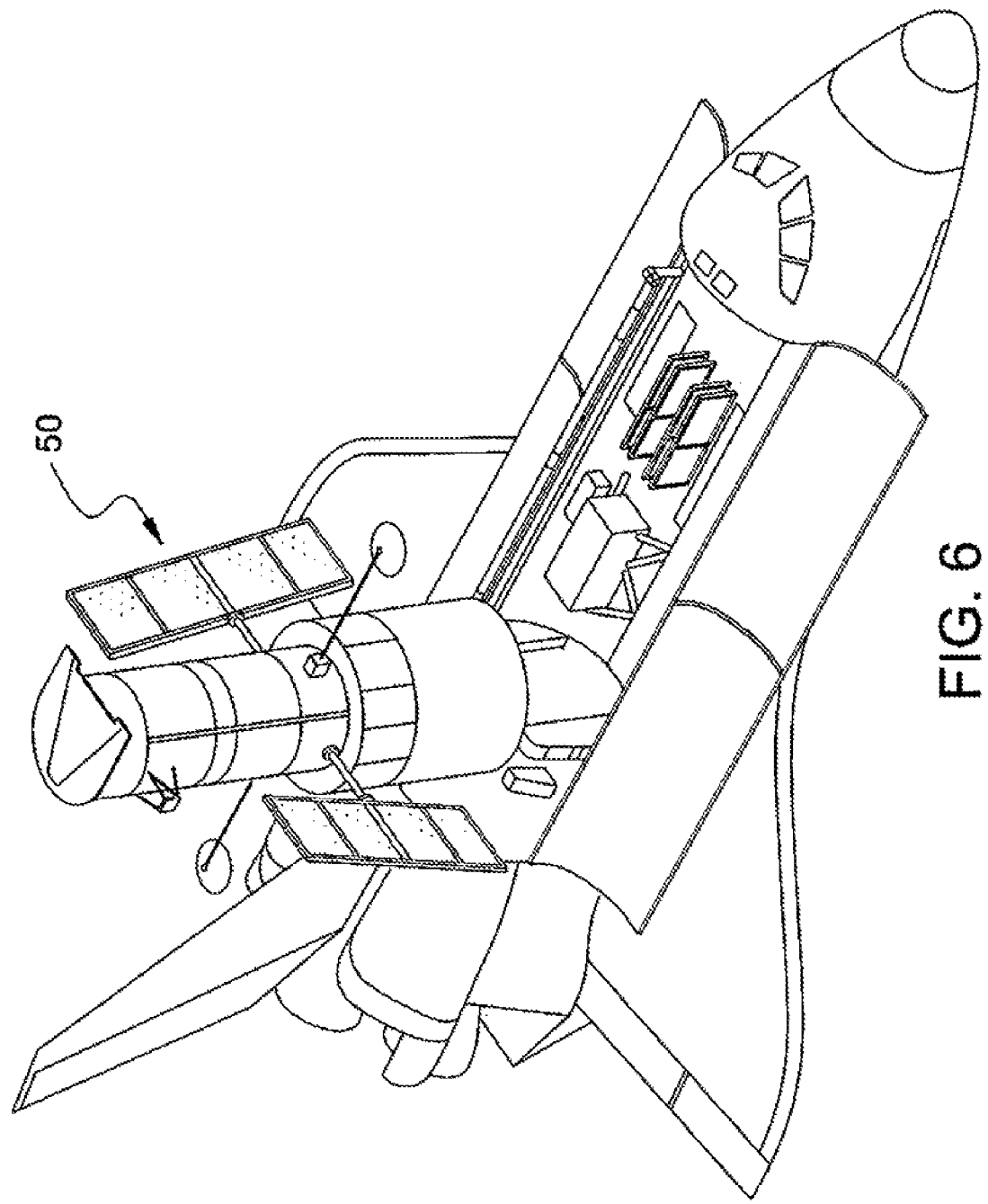
FIG. 6 is a three-dimensional perspective representation of the space shuttle servicing HST.
Figure 7:
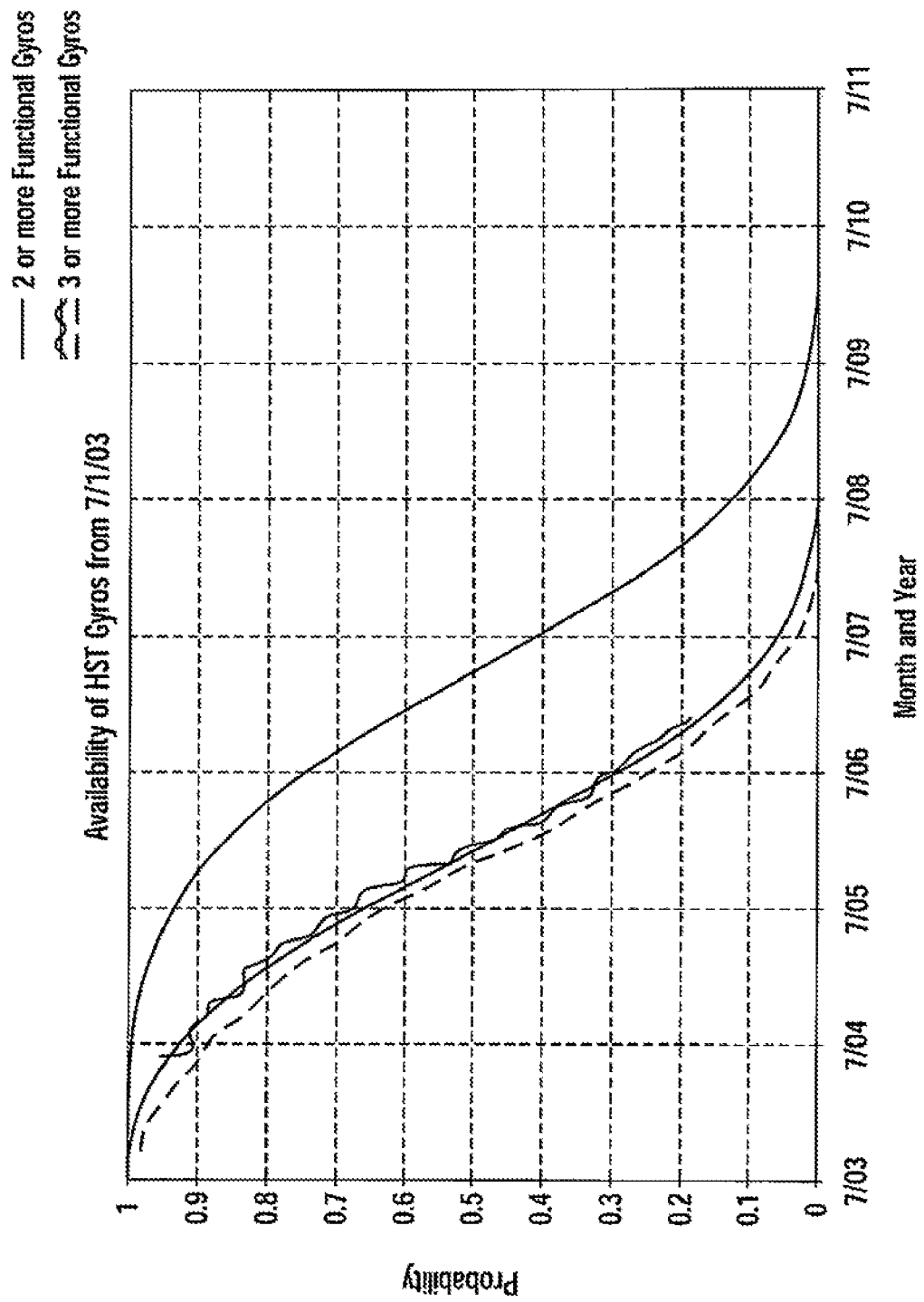
FIG. 7 is graph illustrating the projected deterioration of HST's gyroscopes.

Reference is now made to the drawings, in which like numbers are used to designate like features throughout. Some of the preferred objectives of this invention are to robotically service a target satellite, such as the Hubble Space Telescope (HST) 50, and then provide HST 50 with a de-orbit capability, which will be used upon the completion of the HST mission life. While this specification is describing the invention as it relates to HST 50 as an example, one skilled in the art will recognize that the methods and apparatus disclosed herein are given only as exemplary embodiments. Other embodiments exist that fit within the scope of the invention as defined by the appended claims. Thus, for example, one skilled in the art will readily see that this invention has application to any number of existing free-flying satellites needing servicing and/or de-orbiting, and not just to HST 50.

One embodiment of this invention comprises the Robotic Vehicle (RV) 100, which preferably is launched on an Expendable Launch Vehicle (ELV) 52. The RV 100 preferably includes three basic components: a De-orbit Module (DM) 102, an Ejection Module (EM) 104, and a Robot System (RS) 106 contained within the EM 104. Whereas previous HST servicing missions employed astronauts, the method of this invention is conducted using robotics. After the completion of the servicing mission, the EM 104 and RS 106 preferably are released from HST 50 and optionally de-orbited for a targeted impact into the Pacific Ocean. Alternatively, the released EM 104 and RS 106 may be placed in a parking orbit until needed for servicing another satellite. In contrast, the DM 102 preferably stays attached to HST 50 and eventually provides the de-orbit capability at the end of the HST science mission.

As indicated, the RV 100 preferably includes the DM 102 and EM 104 spacecraft, together with the RS 106. Preferably, a two-fault tolerant separation clamp band (not shown) releasably joins the DM 102 and EM 104 segments mechanically, while electrical harnesses support various Command & Data Handling (C&DH), Guidance, Navigation & Control (GN&C), and Electrical Power System (EPS) functions across the interface. The RV 100 is preferably launched in this combined state and remains combined until the completion of the servicing phase of the mission, at which time the EM 104 separates from the DM 102, while the DM 102 remains attached to HST 50 through end-of-mission. One of skill in the art will recognize that a variety of mechanism for separating DM 102 and EM 104 may be employed without deviating from the scope of the present invention. In addition, the combination of DM 102 and EM 104 into a single spacecraft is also within the scope of the present invention.

In one embodiment of the combined vehicle configuration, the DM 102 provides the "brains" and the EM 104 provides the "muscle," with respect to overall vehicle control. The relative navigation sensors and the algorithms to determine absolute RV 100 attitude and relative attitude (RV 100 to HST 50) reside in DM 102. The GN&C system actuators, thrusters and momentum management devices reside in the EM 104 and respond to the DM 102 commands to obtain the required RV 100 vehicle state. The respective locations of the sensors, actuators, and momentum management devices can be redistributed between the two vehicles in a plurality of combinations without deviating from the scope of the present invention.

Figure 8:
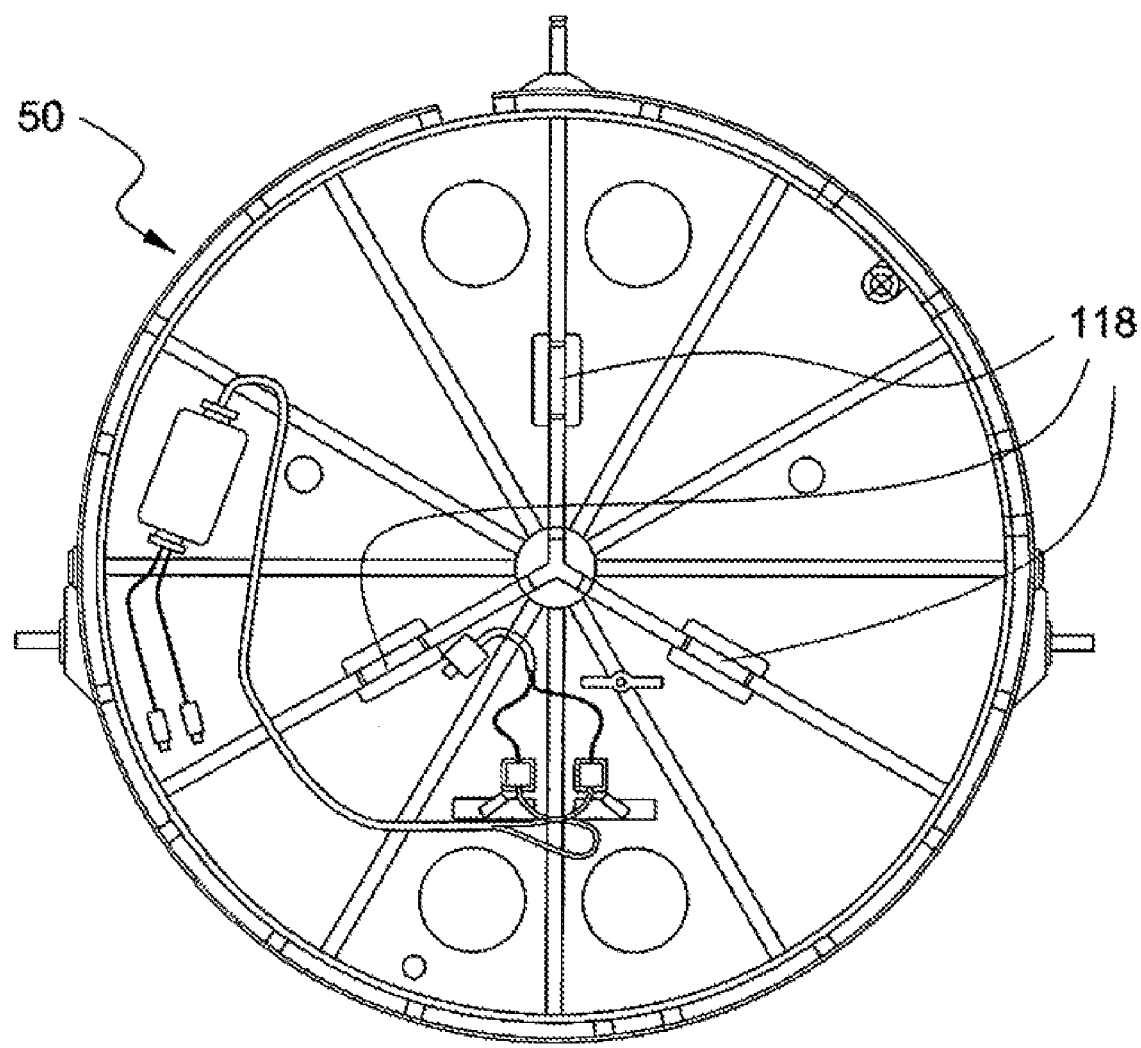
FIG. 8 is a bottom end view of the aft bulkhead of HST illustrating the berthing pins to which the Hubble Robotic Vehicle (RV) attaches at berthing.

In one embodiment, the primary functions of the DM 102 are to provide GN&C attitude determination and control functions for the RV 100, mechanical and electrical interfaces to HST 50, mechanical and electrical interfaces to the EM 104, and controlled reentry of the DM 102 HST 50 combined vehicle at end-of-mission The DM 102 GN&C subsystem preferably includes relative and absolute attitude sensors and their associated algorithms, and actuation hardware to provide three-axis stabilized attitude control. The preferred sensor suite comprises sensors that are both independent and overlap in coverage (range to target) capability, and provides data used by the control algorithms to determine the HST 50 relative state (or orientation) during the automated rendezvous and capture tasks, as described hereafter. Other sensors provide absolute attitude information to maintain desired vehicle pointing during all mission phases. This system, when combined with the actuators in the EM 104, brings the RV 100 into a position that facilitates either a first embodiment wherein the capture of HST 50 is accomplished using the RS 106 Grapple Arm (GA) 108 to capture one of the HST 50 grapple fixtures (see FIGS. 9 and 10) or a second embodiment wherein direct docking to the HST 50 berthing pins located on the aft bulkhead (see FIG. 8) is used. The system allows for capture even in the case where HST 50 is unable to maintain another embodiment, the remote operator may be space based, i.e. resident on the Space Shuttle, International Space Station, or other human occupied spacecraft. In yet another embodiment, the operator may be based on a seaborne platform or airborne platform. Thus, any command that may need to be changed can be done with little or no interruption of the servicing procedure, or, alternatively, the operator can manually carry out the servicing procedure without using the autonomous commands. It is also preferred that one or more of the pre-scripted commands require validation by the ground-based operator prior to it being carried out, thereby providing a stop-check against accident or error.

The preferred apparatus to provide a de-orbiting capability to the spacecraft includes a de-orbit module, which has thrusters and a guidance, navigation and control system for directing the flight path of the spacecraft as it de-orbits. Moreover, the apparatus also may include an ejection module, which contains the robot system, as well as parts for servicing the spacecraft. One skilled in the art will understand that the de-orbit module and the ejection module may separate after servicing is complete, with the de-orbit module staying with the serviced spacecraft until it is ready for de-orbit at a future time. Meanwhile, the ejection module, after separation from the de-orbit module, may de-orbit itself immediately, or, alternately, may proceed to capture another spacecraft in need of servicing. The ejection module optionally may be placed in a parking orbit for some period of time to await instructions to rendezvous with and service and/or deorbit another spacecraft, either at a predetermined time or in response to some unforeseen contingency or component failure on the other spacecraft in orbit.

Tools and space parts for a plurality of spacecraft may be transported on the ejection module to facilitate servicing and/ or de-orbit of a plurality of satellites. Such a generic or multi-satellite serving vehicle may be of particular interest to manufacturers of families of satellites using multiple substantially similar satellites with common components. Such a vehicle could potentially reduce or eliminate the need for costly on-orbit or ground based spare satellites. Rather than placing one or more on orbit spares in orbit in anticipation of potential failures, the present invention provides an alternative means to provide a flexible servicing capability that may enable rapid return to service of a variety of satellites without requirement for entire dedicated spares for each type of a controlled attitude due to degradation of its pointing and control system, which occurs as a result of failing gyroscopes. The GN&C subsystem also supports the controlled HST reentry task at end-of-mission.

The relative navigation sensor selection is based on requirements for redundancy, range capabilities, and Technology Readiness Level (TRL). Two different types of sensors are required for redundancy. The following exemplary sensors may be used under this criteria, although one skilled in the art will understand that other sensors and combinations of sensors fall within the scope of this invention:

Longer Range Sensors (Beginning at 5-3 km):
    Primary: Optech Light Detection and Ranging (LIDAR)—Manufactured by MDR
    Secondary: Laser Camera System (LCS)—Manufactured by NEPTEC Close Range Sensors (10 m and closer):
    Primary: Enhanced Advanced Video Guidance Sensor (EAVGS)
    Secondary: Natural Feature Imaging Recognition (NFIR)—System of Eight Digital Video Cameras with Various Focal Lengths Specifically Positioned to Align with Various HST Features/Targets The following table summarizes the sensor effective ranges for the exemplary sensors relative to HST 50. The dark grey shading shows the effective range of the selected sensor. The light grey shading for the LCS shows the extended range for secondary preferred sensors.

TABLE 2

| Sensor | Field of View (FOV) | Target | Unit | Pursuit (>150 m) | Prox Ops <150 m | Prox Ops <50 m | Prox Ops <30 m | Capture (~0.3 m) |
|---|---|---|---|---|---|---|---|---|
| NFIR | 8 degree (Long Range) | Hubble | Camera 9 | | | | | |
| | | Hubble | Camera 8 | | | | | |
| | 12 degree (Mid Range) | Aft Bulkhead | Camera 7 | | | | | |
| | | Aft Bulkhead | Camera 6 | | | | | |
| | 70 degree (Berthing) | Latch/Berthing Pin | Camera 5 | | | | | |
| | | Latch/Berthing Pin | Camera 4 | | | | | |
| | | Latch/Berthing Pin | Camera 3 | | | | | |
| EACVS | 22 degree (Close Range) | Berthing Target | Camera 2 | | | | | |
| | | Berthing Target | Camera 1 | | | | | |
| LCS | TBD | Hubble | Primary | | | | | |
| | | | Secondary | | | | | |
| LIDAR | N/A | Hubble | Primary | | | | | |
| | | | Secondary | | | | | |

The DM 102 preferably includes a propulsion subsystem, which comprises a number of Small Reaction Control System (RCS) thrusters coupled to four large primary thrusters, a plurality of propellant tanks, and associated valves, filters, and lines. Monopropellant (high purity) propellant is preferably used to fuel the thrusters in order to minimize plume contamination. The DM 102 propulsion subsystem preferably is only used for the DM 102/HST 50 controlled reentry mission phase (described hereafter) in order to minimize propellant slosh during attached science operations. Thus, the DM 102 propulsion subsystem preferably remains pressurized and sealed until actual use in de-orbiting HST 50. At that time, the RCS thrusters are used to point the combined vehicle to the correct attitude in response to the GN&C commands and the primary thrusters will perform the large delta-v burns required for controlled reentry. One of skill in the art will recognize that the foregoing propulsion system is merely exemplary and that a variety of propulsion designs and components alternatively, including, but not limited to, cold gas thrusters and bipropellant liquid rocket thrusters, may be used without deviating from the scope of the present invention.

The C&DH provides the functions required for acquiring, processing, storing, and transferring commands and telemetry. More specifically, the DM 102 C&DH also performs integrated operations with the EM 104 and a safe hold computer. The next table provides a breakdown of an embodiment of a C&DH control and operation for one procedure or method of this invention. All functions, with the exception of input/output to some specialized equipment, preferably utilize a MIL-STD-1553 for exchange of data and commands. The preferred processor is a RAD750 on a Compact Peripheral Component Interface (CPCI) Bus based on a heritage processor design used on the Mars Reconnaissance Orbiter program. Also, a VIRTEX II based imaging processing platform is preferably used for simultaneous processing of multiple (at least five) video sensors. Hot redundant operation of the system preferably provides for concurrent processing.

TABLE 3

| Mission Phase | RV Control | DM C&DH Mode | EM C&DH Mode | DM RIU | EM ACE |
|---|---|---|---|---|---|
| Launch | ELV/DM | Idle to Safe (Breakwire-based) | Idle | Disabled | Enabled |
| Commissioning | DM | Normal | Idle | Disabled | Enabled |
| Pursuit | DM | Normal | Idle | Disabled | Enabled |
| Prox Ops | DM | Normal | Idle | Disabled | Enabled |
| Approach & Capture | DM | Normal (Warm-Backup) | Idle | Disabled | Disabled (Extended Time-out) |
| Servicing | DM | Normal | Idle | Disabled | Enabled |

TABLE 3-continued

| Mission Phase | RV Control | DM C&DH Mode | EM C&DH Mode | DM RIU | EM ACE |
|---|---|---|---|---|---|
| EM Jettison & Deorbit | EM | Standby | Free-Flight | Enabled | Enabled |
| Science | HST/DM (Safemode) | Standby | NA | Disabled | NA |
| DM/HST Deorbit | DM | Normal | NA | Enabled | NA |

The DM 102 communications subsystem is preferably made up of an S-band system using two multi-mode transceivers routed to a pair of low-gain antennas (LGA) for command uplink and telemetry transmission at low data rates through the Tracking and Data Relay Satellite (TDRS) system. High-rate DM 102 data, e.g. video, required during pursuit, capture, proximity operations, and servicing phases is passed through the EM 104 communications system (described hereafter) Ku-band transmitters and high-gain antennas for downlink through the TDRS.

The preferred DM 102 S-band system through the TDRS is capable of command reception at 2 Kbps and 16 Kbps, and transmits telemetry at between 2 and 16 Kbps. Similarly, the preferred DM 102 S-band system routed through EM104 will be capable of command reception at 2 Kbps and transmit between 4 and 16 Kbps.

As one skilled in the art will see, the DM 102 mechanical subsystem design is driven by requirements of the launch and science operations mission phases. During the launch phase, the DM 102 structure preferably is connected to and interfaces with the Expendable Launch Vehicle (ELV) 52 Payload Adapter Fitting (PAF) 54 on one side and to the DM 102/EM 104 separation ring 110 on the other. In this configuration, the DM 102 has to support the EM 104 mass during the launch phase and meet primary mode requirements levied by the ELV 52 provider. Requirements for the science operations phase push the design to be as light and stiff as possible (preferably moments of inertia below 166,000 kg m2 and an approximately 20 Hz first mode).

Figure 12:
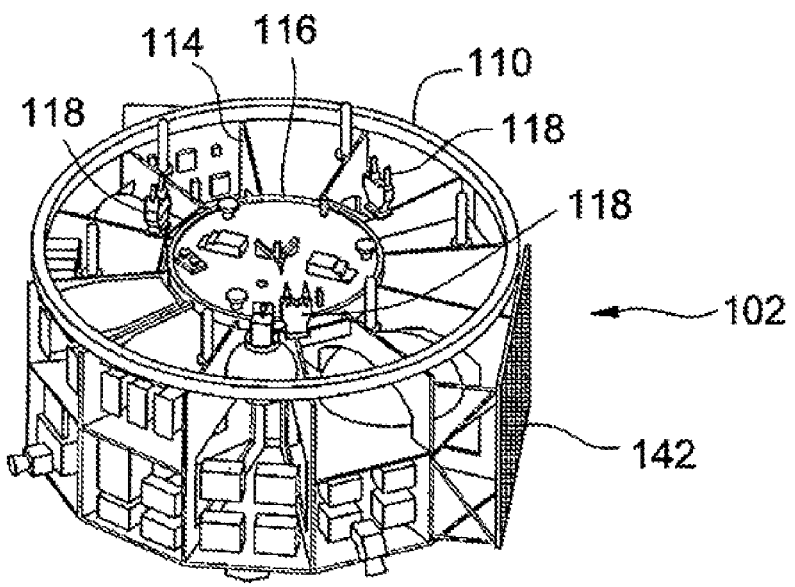
FIG. 12 is an isolated three-dimensional view of the De-orbiting Module (DM).

One embodiment of a structural design that meets these requirements is aluminum honeycomb forward and aft panels 112 with a segmented center bulkhead 114 attached to a central tube 116 for internal frame attachment. FIG. 12 presents an embodiment of a structural design with a typical component layout.

The DM 102 electrical power system (EPS) provides power for the DM 102 during all flight phases and power augmentation to HST post-servicing. One embodiment includes about 90 ft$^2$ of effective solar array area using triple-junction GaAs cells, ten 55 amp hour Li-ion batteries, and associated power conditioning and distribution hardware known to one skilled in the art.

In one embodiment, the DM 102 thermal control subsystem must control temperatures within hardware limits and insure that there is no greater than about 5 W of thermal conductivity from the DM 102 and HST 50 during attached science operations. One embodiment, based on prior known and proven methodology, utilizes heat pipes and software controlled heater circuits to provide the required hardware component thermal environments for all mission phases. Thermal isolation of the berthing latches or pins 118 minimizes heat conducted to HST during science operations.

Figure 13:
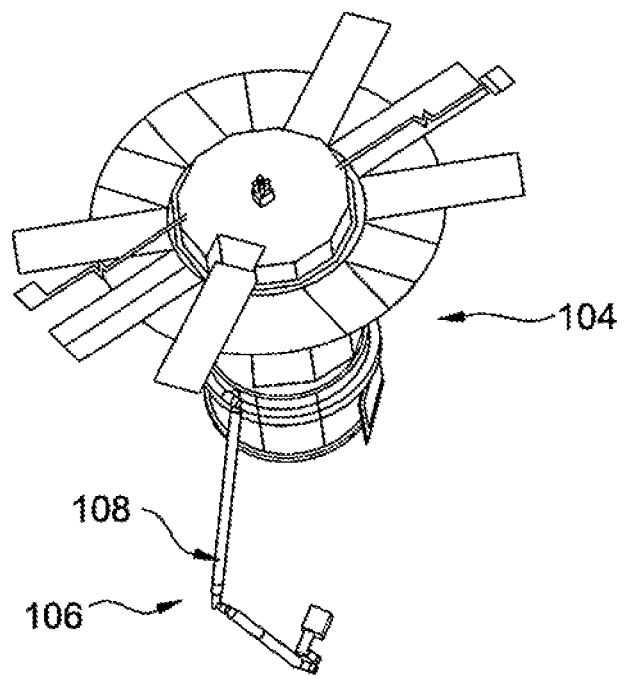
FIG. 13 is a three-dimensional perspective view of the Ejection Module (EM), illustrating the solar array panels in their open position.

Turning attention now to the EM 104, best seen in FIG. 13, in one embodiment, EM 104 preferably functions to provide and/or perform:

GN&C actuation for the RV 100.
Provide all propulsion during pursuit, rendezvous, capture and servicing of HST 50.
Equipment stowage for items that will be replaced on HST 50 as well as for the removed equipment.
Mechanical and electrical interfaces to the RS 106.
Mechanical and electrical interfaces to the DM 102.
Controlled reentry of itself and/or rendezvous with another satellite.
Provide high-rate Ku-band high-gain-antenna communication system.
Provide shadowing for instruments during servicing.
Provide solar array (SA) for electrical power when charging HST 50 during servicing.
Provide reaction wheel assembly (RWA) control.

The EM 104 GN&C subsystem preferably comprises primarily actuators, such as momentum and/or reaction wheels, magnetic torquers, and thrusters, to enable RV 100 pointing, and sensors, such as coarse sun sensors, a plurality (preferably three or more) of axis magnetometers, IMUs and GPS, to enable three-axis stabilized attitude control during EM 104 controlled reentry. The relative navigation sensors and the algorithms to determine absolute RV 100 attitude and relative attitude (RV 100 to HST 50) reside in the DM 102, as explained above. During the majority of the mission, the EM 104 GN&C system actuators, thrusters and momentum management devices preferably respond to the DM 102 commands to obtain the required RV 100 vehicle attitude, i.e. the DM 102 controls the EM 104/DM 102 stack. However, the EM 104 Actuator Control Electronics (ACE) preferably controls its own propulsion system and the EM 104 provides thruster and momentum/reaction wheel actuation throughout all of its primary mission phases. RV 100 attitude control may be provided by the DM 102 during pursuit, proximity operations, capture, docking and servicing. The DM 102 preferably also controls the attitude of both RV 100 and HST 50 throughout the servicing phase of the mission, except when the EM 104 enters into a contingency safehold status. This safehold status preferably is entered if communication is lost between the DM 102 and the EM 104, but may also be entered if another unsafe condition is detected or if commanded by the ground operator. Further, the EM 104 ACE software can provide nominal attitude control during EM 104 separation and de-orbit. In order to establish positive control, the EM 104 computer will assume attitude control of the RV 100/HST 50 stack just prior to separation.

An embodiment of the EM 104 propulsion subsystem includes a number of RCS thrusters coupled to four large primary thrusters. In one embodiment of the invention, the EM 104 propulsion system is only used during mission phases involving the RV 100 as a whole, and, after separation, is used for EM 104 controlled reentry and/or rendezvous with another satellite. One skilled in the art will appreciate that the RCS thrusters and momentum management hardware can point the RV 100 to the correct attitude in response to the GN&C commands received from the DM 102 and the primary thrusters will perform the large delta-v burns required for rendezvous operations with HST 50. The RCS and momentum management hardware will be used during proximity operations to bring the RV 100 into position for HST 50 capture.

Post-capture, this propulsion system preferably is used to maintain the attitude of the RV 100/HST 50 combined vehicle. Upon completion of servicing, the EM 104 may separate from the DM 102 and perform a controlled reentry and/or second rendezvous using these RCS thrusters for pointing and the primary thrusters for any large delta-v burns. The current preference is that EM 104 will carry 4800 lbs of hydrazine fuel distributed among five tanks. Thruster impingement will be controlled to reduce contamination and attitude disturbances to reasonable levels established in the art. In another embodiment, the EM 104 propulsion system is made up of four 100 lb, four 20 lb and 36 7 lb thrusters. One of skill in the art will recognize that a wide variety of thruster sizes and combinations can alternately be used without deviating from the scope of the present invention.

Preferably, the EM 104 C&DH functions to collect and downlink telemetry, collect and downlink video, receive and process spacecraft and robot commands and perform EM 104 separation and de-orbit tasks. The C&DH communication board (not shown) provides a preferred S-band uplink with a nominal 16 Kbps command rate and a 2 Kbps command rate contingency mode. The EM 104 C&DH in one embodiment can service up to 16 hardware discrete commands. The S-band downlink rates are preferably 2, 4, 8 and 16 Kbps, where 8 Kbps is the nominal rate. Ku-band downlink rate preferably is approximately 50 Mbps. The Ku-band downlink may be Reed-Solomon encoded, although one skilled in the art will recognize that other types of encoding may also be used without changing the scope of this invention. Furthermore, all data preferably is delivered to the Ku-band receiver within 200 ms of generation. This C&DH embodiment preferably also provides a continuous command stream at a rate of 10 Hz to the RS 106. In one embodiment, the C&DH main components are a RAD750 processor board, RS interface card, S-band communication card, Ku-band card and a low voltage power supply card.

The EM 104 communications system preferably contains an S-band system using two multi-mode transceivers routed to a pair of Low Gain Antennas (LGA) for command uplink and telemetry transmission at low data rates through the TDRS system. In addition, the preferred system also contains a pair of Ku-band transmitters and steerable High Gain Antennas (HGA) to transmit real-time video and high-rate engineering telemetry through TDRS.

The EM 104 S-band system through the TDRS system is preferably capable of command reception at 2 Kbps and 16 Kbps, and will transmit telemetry at between 2 and 16 Kbps, while the EM 104 Ku-band system preferably transmits channeled video and telemetry at 50 Mbps and 128 Kbps, respectively. The EM 104 S-band system through the Ground Network/Deep Space Network will be capable of command reception at 2 Kbps and transmit telemetry at between 4 and 16 Kbps.

The mechanical subsystem of the EM 104 preferably includes four main sections, namely structure, mechanisms, solar array, and high gain antenna systems. Preferably, structures include propulsion, avionics, and robotic and instrument modules. One skilled in the art will understand that the propulsion module houses propulsion tanks, valves, plumbing, and fill and drain valves, while the avionics module houses batteries and electronics boxes, except for placement of critical GN&C sensors and actuators. Also, the majority of the harnesses preferably are housed in this section. In one embodiment, the robot and instrument module houses replacement instruments for HST 50, such as the Wide Field Camera 3 (WFC3), Cosmic Origins Spectrograph (COS), and Fine Guidance Sensors (FGS), as well as the Dexterous Robot 120, the GA 108, conduits, tools, and tool caddies. Each of these components will be better described hereafter.

The mechanisms subsystem preferably includes the compartment door mechanisms and orbit replacement instrument (ORI) stowage bays. In one embodiment, the WFC3, COS and FGS stowage bays are designed to provide adequate mechanical isolation during all phases of the RV 100 mission. The EM 104 solar array subsystem preferably provides solar shadowing protection to the ORIs and exposed HST 50 cavities during transport and servicing activities. This is done while minimizing the shadowing impingement onto the HST 50 solar arrays. One embodiment of the solar array for the EM 104 is a 14-string daisy-style solar array providing shadowing across the servicing workspace and recharging batteries for the EM 104 during servicing activities. Ten Li-ion batteries are preferred that provide EM 104 power of approximately 3700 W (payload is about 3000 W) during servicing.

An embodiment of the HGA subsystem has an azimuth motor with 360 degree rotational freedom coupled with a +/−90 degree elevation motor which allows the EM 104 HGAs complete hemispheric visibility.

In another embodiment, the EM's electrical power subsystem switches the primary DC power to the EM 104 actuators, mechanisms, sensors, antennas, DR 120, Grapple Arm 108, and electronics boxes. One skilled in the art will understand that the EM 104 electrical power system measures and reports voltages, currents and status of components connected to the EM power bus. In one embodiment, electrical power may be provided for operation of about 200 temperature sensors and approximately 22 heaters.

Figure 14:
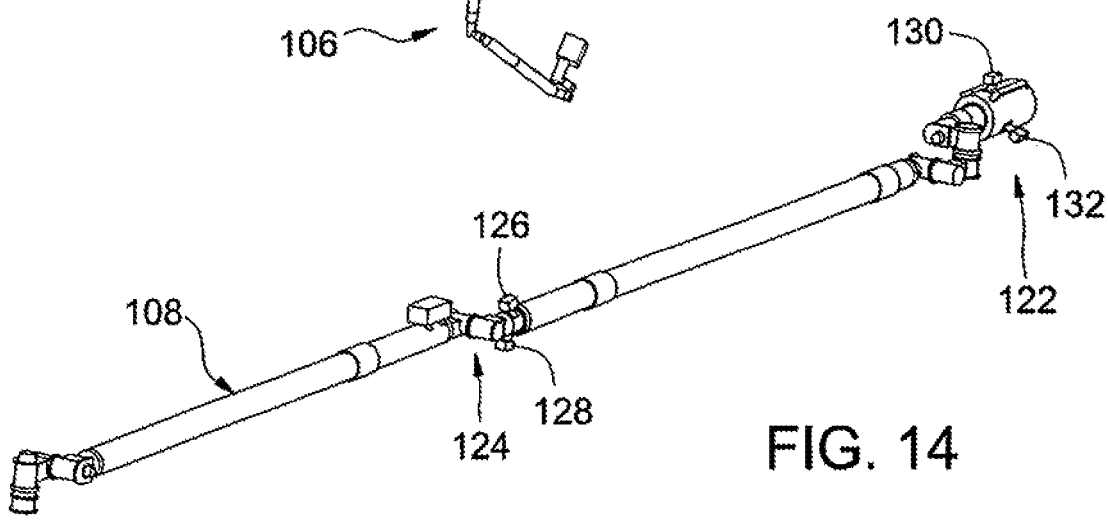
FIG. 14 is a three-dimensional perspective view of the Grapple Arm (GA) shown in the extended position.
Figure 15:
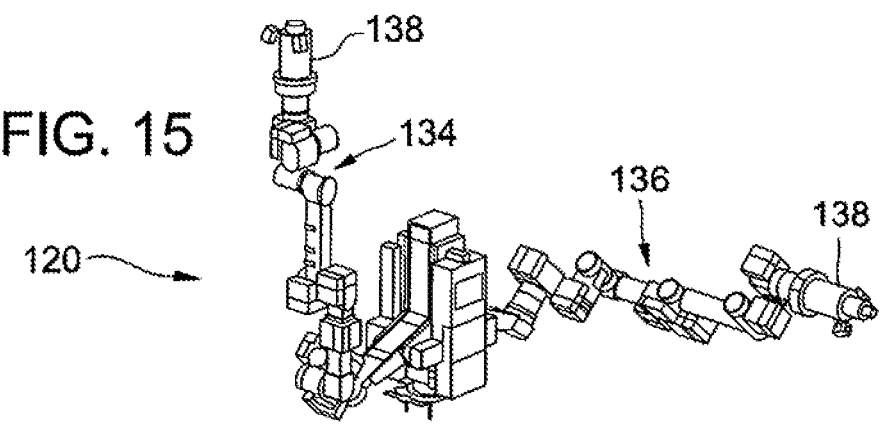
FIG. 15 is a three-dimensional perspective view of the Dexterous Robot (DR) shown with one arm in the extended position.

Referring more specifically to FIGS. 14 and 15, the RS 106 is now discussed. Preferably, RS 106 is housed in the EM 104 and comprises generally the GA 108 and the DR 120, along with appropriate control electronics, such as a vision system (VS), tools and tool caddies for servicing HST 50.

Figure 9:
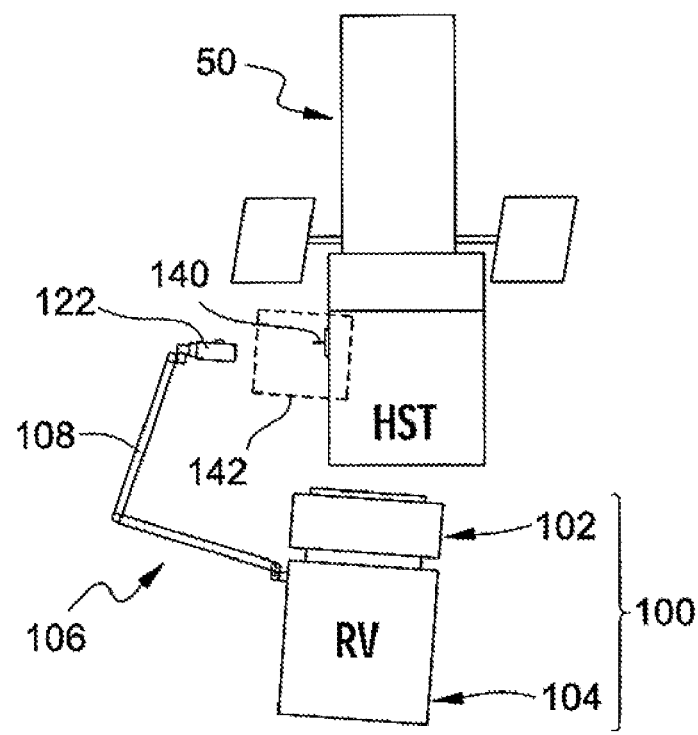
FIG. 9 is a schematic of HST in alignment with the RV immediately prior to berthing, illustrating a preferred capture box and grapple fixture for initial connection of the RV to HST.
Figure 10:
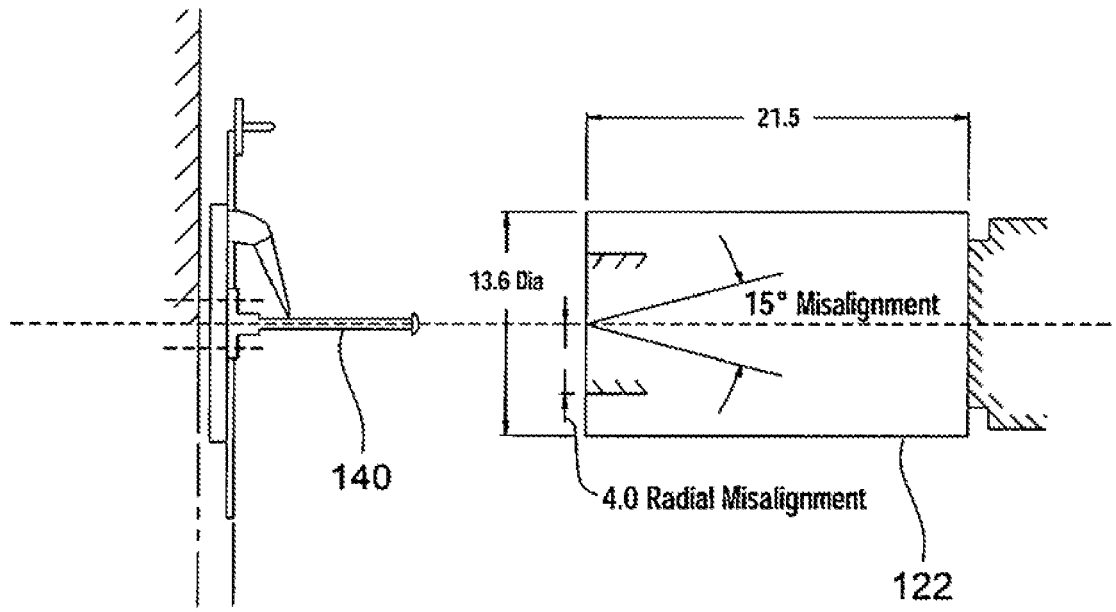
FIG. 10 is a close-up view of the grapple fixture of FIG. 9.
Figure 11:
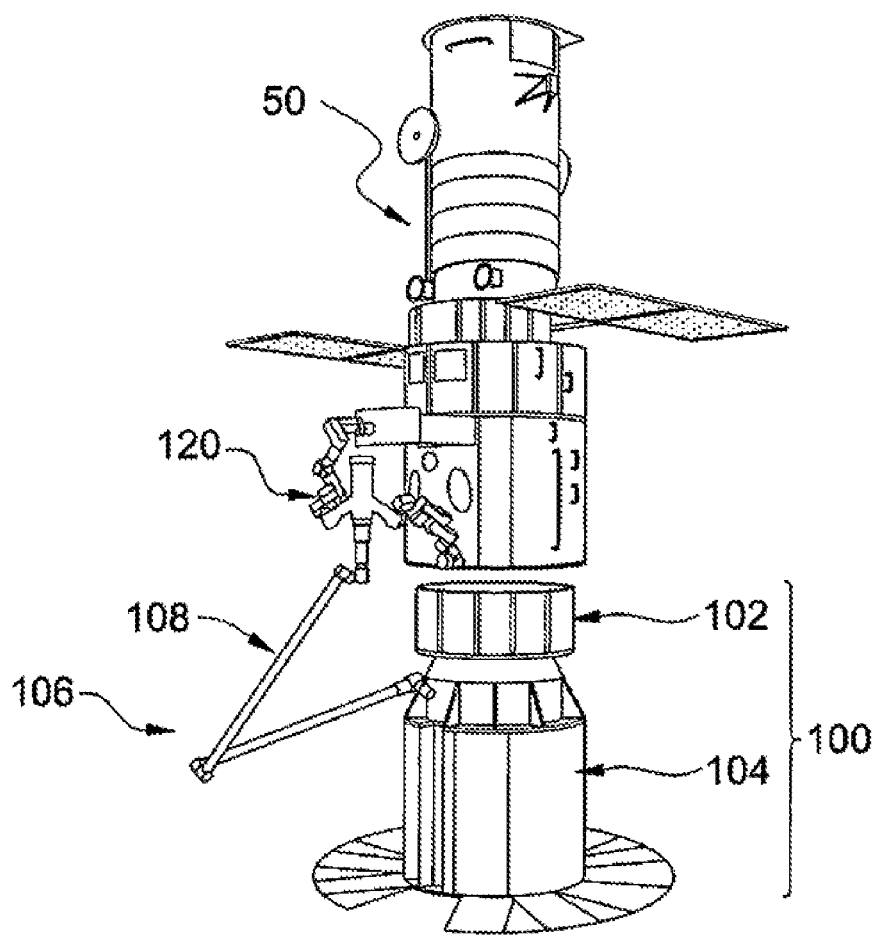
FIG. 11 is a three-dimensional perspective view of the RV connected to HST, and shows the robotic servicing concept using a preferred grapple arm.

Preferably, the GA 108 is a multi-axis manipulator with a Grapple Arm End Effector (GAEE) 122 on one end providing a power/data/video interface. One embodiment calls for the GA 108 to be responsible for capturing HST 50 via either of the two grapple fixtures (in conjunction with GN&C system), as shown in FIGS. 9 and 10, and for positioning the DR 120 for servicing as required. This preferred GA 108 provides six degrees of freedom and a 39 ft. total reach (one 20 ft and one 19 ft link). There are preferably two cameras 126 and 128 on the elbow 124 and two cameras 130 and 132 on the GAEE 122. The GA 108 of this embodiment weighs about 1500 lb and will operationally require approximately 210 W. peak, 100 W. average, power. One of skill in the art will recognize that the foregoing robot system is merely exemplary and a variety of robotic mechanisms and techniques known in the art could be substituted without departing the scope of the present invention.

One embodiment of DR 120, illustrated in FIG. 15, is responsible for servicing HST 50, in conjunction with the GA 108 and attendant tools. It is comprised of dual manipulator arms 134 and 136 (about 11 ft total length each) with 7 degrees of freedom each, multiple camera units with lights, and an Orbital Replacement Unit (ORU) Tool Change-out Mechanism (OTCM) 138 or end-effector (not shown) on the end. The DR 120 of one embodiment weighs approximately 2950 lb. and will operationally require 2000 W. peak, 1700 W. average, power. The size, weight, and power requirements for the DR and its robotic mechanisms may be varied to accommodate servicing missions on satellites of various sizes and complexities Preferably, the VS is responsible for and displays situational awareness during RV 100 mission phases. The VS provides an integrated camera and video delivery system comprising a series of cameras, lights, and electronic boxes that reside at various locations on the RS 106 and the RV 100. The VS provides visual verification and active vision, using still and streaming video from its complement of cameras, feed back for automated sequencing, manual and scripted servicing, visual inputs to AI logic, and error model correction, and HST 100 inspection and survey activities.

One embodiment of a VS complement of cameras includes eight on the robot torso, eight on the OTCM 138, two LIDAR cameras, two on the GA 108 elbow 124, two on the GAEE 122, two on the bay and about fourteen situational awareness cameras for a total of 38 cameras. Those skilled in the art will realize that each of these cameras is connected to a Video Control Unit (VCU). The VCU collects the video data from the active cameras connected to it and converts the raw image data, preferably to JPEG2000. The JPEG2000 format includes any compression, if selected.

Moreover, one embodiment of the VS contains a command and telemetry interface to the EM 104 C&DH that enables VS control, configuration, state of health and video distribution. Remote commands may be used to control power, frame rates, and compression ratios of each camera. Two additional stereoscopic cameras may be used to provide detailed worksite views and support machine vision function for worksite localization that allow the remote operators to monitor robot configuration, servicing task operations, and other activities Looking now at the method of carrying out the invention, one skilled in the art will readily observe that the preferred objectives of the methods for the exemplary HST servicing mission are threefold:

To enable the safe disposal of the HST 50 when it reaches the end of its useful life.

To implement life extension measures that will assure HST 50 mission life for at least five years beyond the completion of the servicing mission.

To enhance the scientific capability by installing the scientific instruments planned for SM-4.

One embodiment of the invention meets these objectives as follows. Towards meeting the first objective, the DM 102 may to be attached to the HST 50 for later use as a de-orbit vehicle. To meet the second, a new set of gyroscopes, batteries, and a replacement FGS may be installed. And, to meet the third objective, the WFC3 and COS instruments may be installed. Each of these procedures, as well as a preferred over-all mission procedure, will be described in greater detail.

One embodiment of a Robotic Servicing and De-Orbiting Mission (RSDM) mission may be defined by the following phases or steps: launch, RV commissioning, pursuit, proximity operations, approach and capture, servicing, EM ejection and disposal, science operations, and HST/DM disposal. The description that follows will specifically discuss a servicing mission to HST 50. However, one of skill in the art will recognize that the principles disclosed herein can be applied to servicing and/or de-orbiting of a variety of spacecraft in orbit around the earth or elsewhere in space. It will also be clear to one of skill in the art that the robotic servicing and de-orbit phases may be implemented independently; servicing without de-orbit or de-orbit without servicing may be implemented for a particular spacecraft if desired. If the target satellite is in an orbit, such as geostationary, where de-orbit may not be practical or cost effective, a de-orbit module can be used to place the target satellite into a disposal orbit, for example above the geostationary band. The following table summarizes each phase of the exemplary mission.

TABLE 4

| Phase | Duration | Phase Begins | Phase Ends | Highlights |
|---|---|---|---|---|
| Launch | 2-3 hours | Launch | RV in a power positive configuration | Launch, stage 1 ignition/separation, stage 2 ignition/separation, RV separation, EM establishes power positive attitude with solar panels deployed. |
| RV Commissioning | 14 days | RV has established power positive configuration. | Checkout activities complete. | Checkout RV systems and GA. |
| Pursuit | 2-12 days | RV commissioning completed. | Ends just prior to maneuver to the safety ellipse. | Includes orbital maneuvers to bring the RV to the final co-elliptic orbit within relative navigation sensor range of the HST. |
| Proximity Operations | 1-2 days | Begins with the maneuver from the final co-elliptic orbit to the Safety Ellipse. | Ends just prior to leaving the final safety ellipse. | Enter safety ellipse, survey HST, HST and RV preparations for capture. |
| Approach and Capture | 2 hours | RV maneuvers away from the safety ellipse to | Ends with the completion of the mechanical berthing/docking | Deploy GA, grapple HST, position HST in berthing latches |

TABLE 4-continued

| Phase | Duration | Phase Begins | Phase Ends | Highlights |
|---|---|---|---|---|
| | | the capture axis. | of the RV to HST with the mated spacecraft (RV/HST) in a preferred sun-pointing attitude. | and partially close latches, maneuver stack to sunpoint attitude, complete latch closure. |
| Servicing | 30+ days | Mechanical docking complete. | Ends when the EM receives authority to take control of the HST/RV stack prior to separation. | Battery augmentation, WFC3/RGA II, COS, FGS, reboost (optional). |
| EM Ejection & Disposal | 4 days | EM takes control of HST/RV stack from the DM. | Completion of controlled disposal of the EM. | Separate EM from DM, perform evasive maneuvers, perform de-orbit burns, impact in Pacific. EM continues this phase while HST/DM enters science operations. |
| Science Operations | 5+ years | EM ejection from HST/DM stack. | End of science observations and end of life testing. | Verification, nominal science operations. |
| HST/DM disposal | 4 days | End of science operations. | Safe disposal of HST/DM. | De-orbit burns, impact. |

In one embodiment, RV 100 and HST 50 each have their own safing systems. Accordingly, prior to initiation of the capture phase, the HST safing system is disabled to prevent any unintended change in attitude or solar array motion. The system will remain disabled until after the EM 104 has separated from the DM 102, although some HST 50 tests may be enabled during the mission to protect against inadvertent solar array motion. The following table shows which vehicle has primary safing authority for each mission phase in one embodiment.

TABLE 5

| Vehicle Configuration | Mission Phase | Software Safing Strategy | Hardware Safehold |
|---|---|---|---|
| RV | Launch, Pursuit and Proximity Operations | DM Software Safe Hold, Mission Manager Abort | EM |
| RV | Capture | DM (Use Redundancy), Mission Manager Abort | EM |
| RV + HST | Servicing | DM Software Safe Hold | EM |
| EM | Ejection | EM | EM |
| EM | EM De-orbit | EM | EM |
| DM + HST | Science | HST with DM backup | HST PSEA DM SHM Disabled |
| DM + HST | HST De-orbit | DM Software Safe Hold, Mission Manager Abort | DM |

Figure 16:
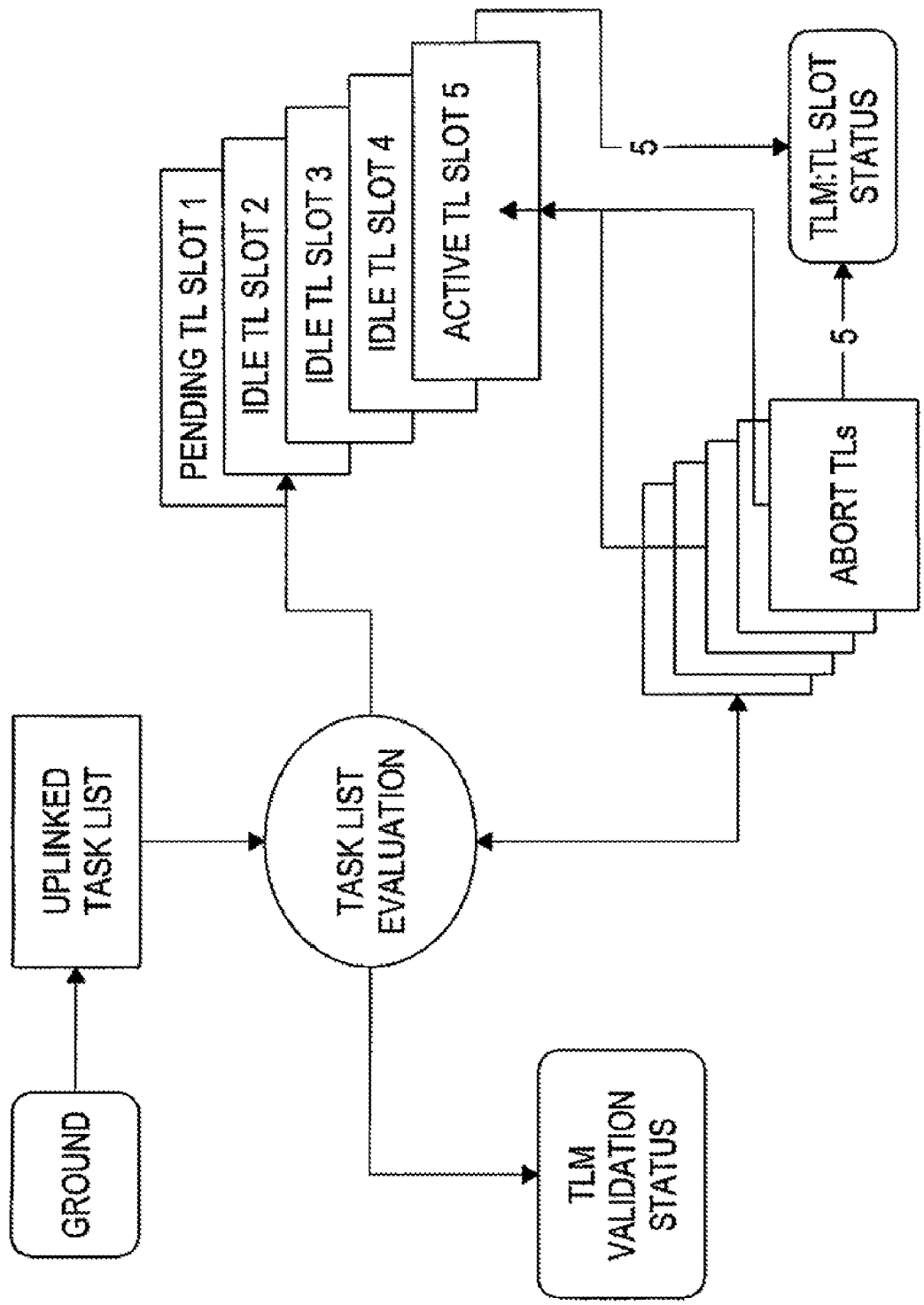
FIG. 16 is a schematic representation of the "Mission Manager" concept.

Preferably, the DM 102 will utilize previously known Mission Manager (MM) software for most Guidance, Navigation and Control (GN&C) commanding requirements, although one skilled in the art will observe that other software can used to accomplish this function without departing from the scope of this invention. MM allows the RV 100 to implement the GN&C sequences autonomously with optional remote intervention programmed in at key points. FIG. 16 graphically depicts the MM concept. As indicated, this software utilizes task lists that are tied to the mission phases as discussed in the following sections. MM may hold up to five nominal and five abort task lists that are uploaded one at a time from the remote operator, each containing up to 100 tasks per list, although only one task list will be active at any given time. When received by MM, a remote-specified task list preferably is validated, and then moved to the specified task list slot. Each task in a nominal task list preferably has a corresponding abort task list slot. If an abort occurs during a task, the associated abort task list will be initiated for the abort sequence. A task list preferably is not allowed to span mission phases, and a separate GN&C remote command is required in order to change a mission phase. Each task within a task list may contain an Authority To Proceed (ATP) flag that, if set, will allow that task to proceed to the subsequent task in the list upon nominal completion. If the ATP is not set (i.e. ATP flag=0), the task will suspend upon nominal completion and await explicit authorization to proceed from the remote operator. If desired, a second task list may be set to "pending," such that it will automatically execute pending nominal completion of the active task list. Preferably, only one task list can be defined to be active, and only one task list can be defined to be pending at any given time.

Figure 17B:
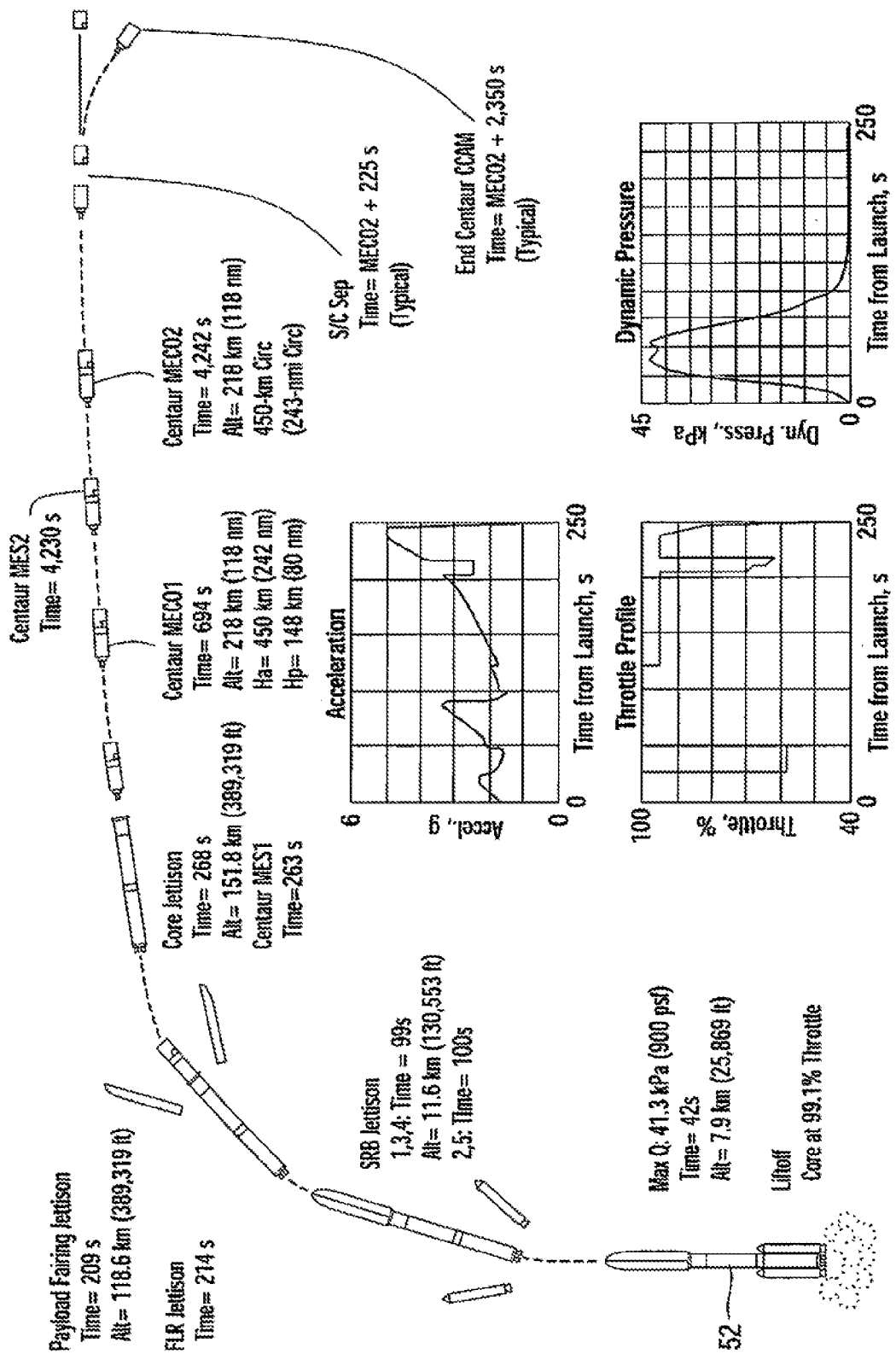
FIG. 17B is a graphic representation showing a typical ascent for an Atlas V rocket, which could be used in conjunction with this invention, embarking on a Low Earth Orbit (LEO) mission.

Referring now to FIGS. 17A and 17B, the preferred launch phase starts at T-0 and terminates when the RV 100 achieves a power positive configuration after separation from the second stage. FIG. 17A is a summary of the launch phase and FIG. 17B shows a typical ascent for an Atlas V expendable launch vehicle 52 engaged in a low earth orbit (LEO) mission. Based on the size of the RV 100, an Evolved Expendable Launch Vehicle (EELV) 52, i.e. an Atlas V or a Delta IV rocket with a five meter fairing could be used.

The major systems of the RV 100 preferably are configured for launch as follows:

DM 102 C&DH prime on
EM 104 C&DH prime and redundant on
All receivers on
ACE box off
Reaction wheels off The launch dispersions for the ELV 52 currently provide the following preferred accuracies: altitude ±10 km and inclination ±0.04°. In order to further protect HST 50 from the RV 100 and to provide time for vehicle checkout after separation from the ELV 52 upper stage, the following conditions are preferred in one embodiment:

Circular orbit 20 km below the altitude of HST 50 at the time of launch.
Initial in-plane separation (phase angle) of 0-360 degrees, which varies with launch epoch.
Right ascension difference to target HST 50 plane at end of pursuit phase:
Allows relative drift of ascending node due to differential gravitation ($J_2$).
A function of initial phase angle, semi-major axis difference and time to rendezvous.
This drift constrains maximum time before first pursuit phase maneuver.

The difference in semi-major axes will drive a differential rate of regression of the Right Ascension of the Ascending Node (RAAN). Consequently, the target orbit may include a RAAN offset such that the orbit planes align at the nominal end of the pursuit phase. This differential RAAN constrains the allowable time before the first maneuver is executed; the first burn is nominally at launch +14 days.

Preferably, all activities in the launch phase are nominally to be performed autonomously, meaning that each task is carried out without direct human intervention. In one embodiment, each task may be pre-scripted. In another embodiment, at least some of the tasks may be initiated by Artificial Intelligence (AI) logic resident in RV 100. As in the case of pre-scripted commands, a capability for the remote operator to override any AI-generated commands may be provided. Alternately, the AI logic may propose a course of action that must be concurred in by the remote operator before being executed. In yet another embodiment, the remote operator pre-loads the GN&C launch task list into the DM 102, and after separation from the ELV 52, a breakwire—based DM 102 transition from idle mode to safe mode occurs. This also initiates the execution of the launch task list. The following events then may occur within the EM 102:

Turn on S-band transmitter
Turn on ACE
Power on the reaction wheels
Turn on the catalyst-bed heaters
Delay ten minutes
Open propulsion system valves
Activate thruster power bus
Start solar array deployment sequence (except the sections that cover the stowed GA 108)

Next, the RV 100 preferably uses the reaction wheels to damp any tip off rates and then maneuvers to a −H1 sunpoint attitude. Torquer bars preferably are used to dump momentum. If the wheels saturate, the DM 102 preferably activates momentum damping using thrusters, after allowing sufficient time for heaters to warm up the catalyst-beds. In another embodiment, a momentum wheel or wheels may be used to manage the tip off rates and to control the pointing attitude of RV 100.

RV commissioning preferably begins with the RV 100 in a power positive attitude with the EM 104 daisy solar array deployed, and ends when checkout of the RV 100 is complete and the maneuvers to initiate pursuit of the HST 50 are about to occur. FIG. 18 is a summary of the RV commissioning phase.

Once on orbit, RV systems preferably are activated and verified for proper performance. Commanding comes from a combination of real-time and stored commands. In one embodiment, this process takes approximately 14 days and is summarized as follows:

RV 100 orbit determination.
RV 100 GN&C checkout.
Activate Ku-band downlink.
Check out DM 102 sensors.
Activate LIDAR.
Activate and checkout GA 108.

The objective of these tests is to verify proper operation of the GA 108 and measure performance that could not be verified directly on the remote station before it is used near HST 50. Each test includes aliveness, functional and zero-gravity performance tests. Preferably, the pursuit phase begins after the RV commissioning is completed and terminates just prior to the maneuver to place the RV 100 on the safety ellipse. All the GN&C activities preferably are contained in the pursuit phase task list and are performed autonomously with appropriate Authority to Proceed (ATP) points for any actions that require a remote command to authorize continuation of the task list. FIG. 19 is a summary of the pursuit phase.

The pursuit phase preferably includes a number of burns, detailed in the table below. Preferably, the EM 104 provides the propulsion during this phase using its RCS with the DM 102 providing the vehicle navigation control. In one embodiment, the first two bums are executed to raise the co-elliptic orbit to 5 km below HST 50 and are executed after the 14 day commissioning phase. This slows the relative in-plane drift between the RV 100 and HST 50. Initial sensor acquisition preferably happens at this point. As RV 100 closes on HST 50 from below and behind, two more maneuvers preferably are made to raise the orbit to about 1 km below HST 50. Again the relative in-plane drift is slowed. A maneuver may then be made to correct for any out of plane error that may be due to launch dispersion or timing errors of the first two orbit boosts of the RV 100. The acquisition of HST 50 with relative navigation sensors such as LIDAR may now happen as RV 100 approaches within 5 km of HST 50, still from below and behind. After HST 50 acquisition, the RV 100 can now get nearly continuous range measurements to HST 50.

TABLE 6

| Maneuver | MET | Action | Delta V m/s | Delta V ft/s | Fuel Mass Consumed kg | Fuel Mass Consumed lbm | Contingency? |
|---|---|---|---|---|---|---|---|
| 1 | Launch plus 14 days | Remove inclination error (max 0.04 deg) | 5.3 | 17.4 | 37.9 | 83.6 | Launch dispersion |
| | | Remove RAAN error from 2 weeks inclination error | 2.2 | 7.2 | 15.7 | 34.6 | Launch dispersion |
| | | Remove RAAN error from HST state error | 0.8 | 2.6 | 5.7 | 12.6 | Launch dispersion |
| 2-3 | Launch plus 14 days | Remove altitude error from launch | 5.5 | 18.0 | 39.2 | 86.4 | Launch dispersion |
| 4-5 | Launch plus 14-30 days | Achieve coelliptic 5 km below HST | 8.2 | 26.9 | 58.5 | 128.9 | |
| 6 | Launch plus 16-31 days | Remove remaining out of plane error | 0.5 | 1.6 | 3.5 | 7.8 | |
| 7-8 | Launch plus 17-33 | Achieve coelliptic 1 km below HST | 2.2 | 7.2 | 15.6 | 34.3 | |
| 9-10 | As required | Achieve coelliptic 1 km above HST | 1.1 12.3 | 3.6 12.3 | 7.8 123.4 | 17.2 123.4 | Launch dispersion or failure to acquire rel-nav |
| Total (no margin included) | | | 25.8 | 84.6 | 184 | 405 | |

The proximity operations phase preferably begins with the maneuver from the final co-elliptic orbit to the safety ellipse. And the proximity operation phase ends just prior to the maneuver to leave the final safety ellipse to initiate the capture phase. Commanding of the RV 100 in this phase is autonomous with ATP points. FIG. 20 is a summary of the proximity operations phase.

small maneuvers (low delta-v). Another advantage of the WSE is that it allows a thorough inspection of HST 50 as RV 100 circumnavigates it, thereby increasing the ability to observe HST 50. If the LIDAR does not acquire the HST 50, then the RV 100 passes safely under HST 50 and the maneuver plan will be revised. Burns for this phase are detailed in the following table:

TABLE 7

| Maneuver | Duration | Action | Delta V m/s | Delta V ft/s | Fuel Mass Consumed kg | Fuel Mass Consumed lbm | Contingency? |
|---|---|---|---|---|---|---|---|
| 1-3 | 45 min | Target safety ellipse 1 km ahead of HST | 0.59 | 1.94 | 4.12 | 9.09 | |
| | | Midcourse correction | 0.10 | 0.33 | 0.70 | 1.54 | |
| | | Achieve safety ellipse 1 km ahead of HST | 0.39 | 1.28 | 2.72 | 6.01 | |
| | as required | Recover to 1 km above or below HST, approach HSt and repeat 1-3 | 2.77 | 9.09 | 19.33 | 42.62 | Failure to achieve safety ellipse |
| 4-11 | 18 hrs | Maintain SE 1 km ahead for 18 hrs (TBR) | 0.03 | 0.11 | 0.23 | 0.51 | |
| 12-17 | 18 hrs | Walking safety ellipse to center HST | 0.05 | 0.17 | 0.36 | 0.80 | |
| | as required 10 days | Remove relative drift and maintain HST-centered safety ellipse (every 3 orbits for 10 days) | 0.44 | 1.44 | 3.07 | 6.77 | Provides 10 days on SE to determine HST relative attitude state |
| Total (no margin included) | | | 3.30 | 10.81 | 30.54 | 50.70 | |

Figure 21:
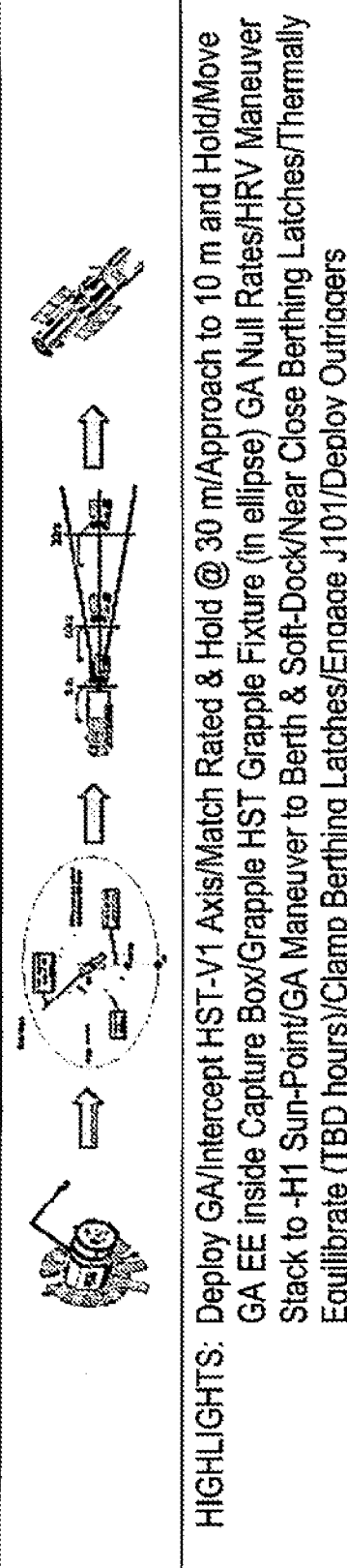
FIG. 21 is a chart summarizing the approach and capture phase of an embodiment according to the present invention.

In one embodiment, as RV 100 passes below HST 50, the LIDAR acquires HST 50 and a sequence of small maneuvers is performed in order to put RV 100 on a 100 m×50 m×50 m Fehse-Naasz Walking Safety Ellipse (WSE) about HST 50. The WSE is a natural relative motion, best described as a path along the surface of a cylinder with an axis along the HST 50 velocity vector. Consequently, the WSE is preferably strictly non-interfering with HST 50 as the points where the RV 100 and HST 50 orbital planes intersect coincide with maximum RV 100/HST 50 radial separation. The relative along-track RV 100/HST 50 separation can be controlled by periodic In one embodiment, the approach and capture phase begins when RV 100 leaves the WSE and terminates with the completion of the mechanical berthing/docking of the RV 100 to HST 50 with the mated spacecraft in a preferred sun-pointing attitude. FIG. 21 is a summary of the approach and capture phase. Commanding of the RV 100 during this phase will be primarily autonomous with ATP points programmed in.

Figure 22A:
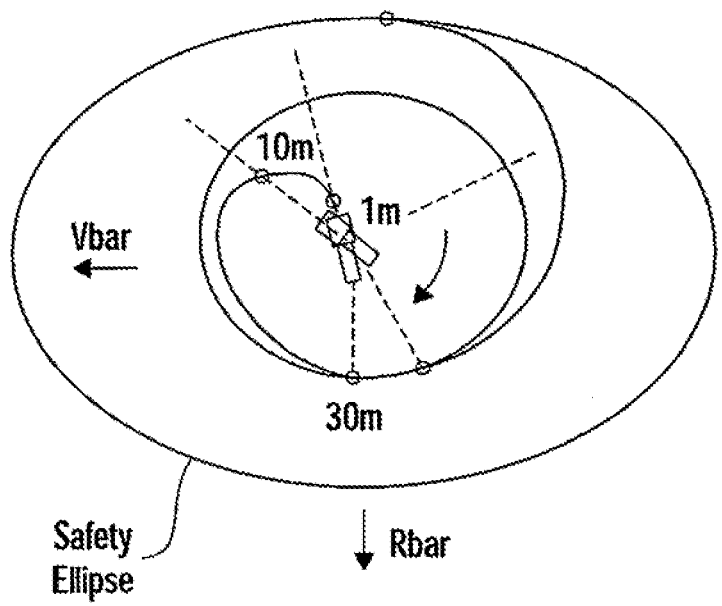
FIG. 22A is a diagram representing the safety ellipse of the approach and capture maneuver profile of an embodiment according to the present invention.
Figure 22B:
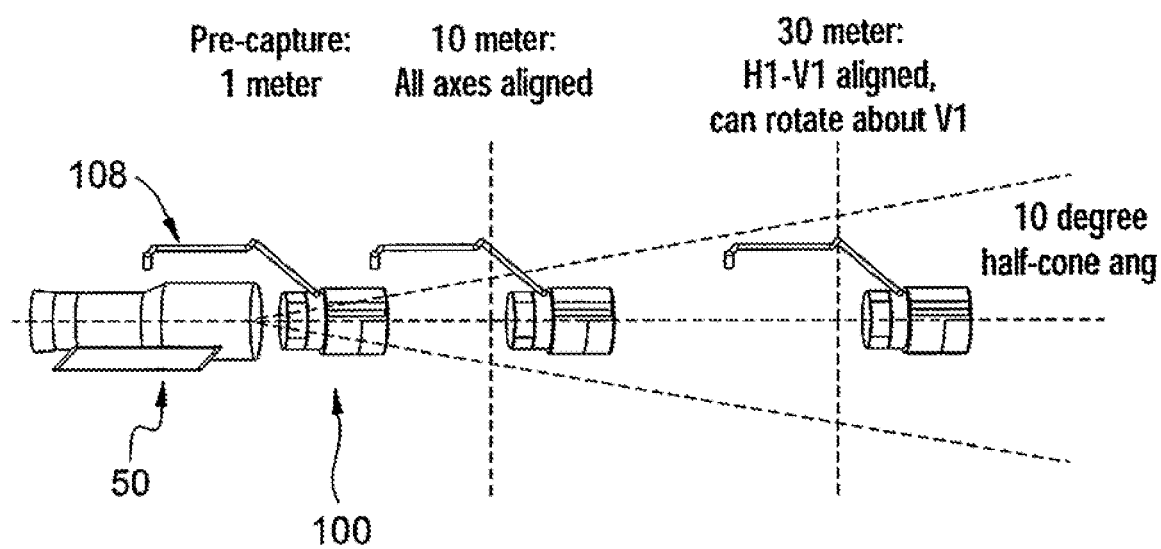
FIG. 22B is a diagram representing the approach range of the approach and capture profile of an embodiment according to the present invention.

In another embodiment, the approach and capture phase begins with a sequence of maneuvers that puts the RV 100 on the capture axis of HST 50. The capture axis is currently preferred to be the −V1, or in other words the negative end of HST's main longitudinal axis. In another embodiment, the −V3, or in other words negative lateral axis might be used since it has certain advantages in some situations (notably GS 108 reach). The RV 100 preferably maintains its position on the capture axis at a fixed range (nominally 30 meters, but certainly outside the geometry of HST 50) by matching rates direction maneuvers to allow RV 100 to approach HST 50 from the nadir direction while minimizing thruster plume contamination of HST 50. FIGS. 22A and 22B show a typical capture maneuver profile. The two tables immediately below show the maneuver plans for a controlled and uncontrolled HST50, respectively.

TABLE 8

| Maneuver | Duration | Action | Delta V | | Fuel Mass Consumed | |
|---|---|---|---|---|---|---|
| | | | m/s | ft/s | kg | lbm |
| R-Bar approach | 30 min | Transfer along R-Bar to 30 m-V1 hold from SE below HST | 0.56 | 1.84 | 3.88 | 8.55 |
| LVLH Stationkeep | 20 min | 20 minute hold at 30 m-V1 separation | 0.14 | 0.46 | 0.98 | 2.16 |
| HST Stationkeep | 10 min | Approach to 10 m hold point | 0.10 | 0.33 | 0.67 | 1.48 |
| HST Stationkeep | 10 min | 10 minute hold at 10 m hold point | 0.05 | 0.16 | 0.52 | 1.15 |
| HST Stationkeep | 10 min | Approach to 1 m hold point | 0.04 | 0.13 | 0.37 | 0.82 |
| HST Stationkeep | 10 min | 10 minute hold at 1 m hold point | 0.02 | 0.07 | 0.19 | 0.42 |
| HST Stationkeep | 10 min | retreat to 10 meter hold point | 0.08 | 0.26 | 0.78 | 1.72 |
| HST Stationkeep | 10 min | hold at 10 meter hold point for 10 minutes | 0.16 | 0.52 | 1.56 | 3.44 |
| 2 burn | 45 min | Safe return to safety ellipse | 1.12 | 3.67 | 7.81 | 17.22 |
| Total per capture attempt (no margin included) | | | 2.27 | 7.45 | 16.76 | 36.95 |
| Total for 4 capture attempts (no margin included) | | | 9.08 | 29.79 | 67.04 | 147.80 |

TABLE 9

| Maneuver | Duration | Action | Delta V | | Fuel Mass Consumed | | Contingency? |
|---|---|---|---|---|---|---|---|
| | | | m/s | ft/s | kg | lbm | |
| 2 burn | 45 min | Maneuver to predicted docking axis from SE | 1.50 | 4.92 | 10.47 | 23.08 | |
| HST Stationkeep | 20 min | 20 minute hold at 30 m-V1 separation | 4.00 | 13.12 | 39.02 | 86.04 | |
| HST Stationkeep | 10 min | Approach to 10 m hold point | 1.90 | 6.23 | 18.55 | 40.90 | |
| HST Stationkeep | 10 min | 10 minute hold at 10 m hold point | 0.90 | 2.95 | 8.79 | 19.38 | |
| HST Stationkeep | 10 min | Approach to 1 m hold point | 0.40 | 1.31 | 3.90 | 8.60 | |
| HST Stationkeep | 10 min | 10 minute hold at 1 m hold point | 0.20 | 0.66 | 1.95 | 4.30 | |
| HST Stationkeep | 10 min | retreat to 10 meter hold point | 0.40 | 1.31 | 3.90 | 8.60 | Failed capture |
| HST Stationkeep | 10 min | hold at 10 meter hold point for 10 minutes | 0.90 | 2.95 | 8.78 | 19.36 | Failed capture |
| 2 burn | 45 min | Safe return to safety ellipse | 1.50 | 4.92 | 10.44 | 23.03 | Failed capture |
| Total per capture attempt (no margin included) | | | 11.70 | 38.39 | 105.82 | 233.29 | |
| Total for 4 capture attempts (no margin included) | | | 46.80 | 153.54 | 423.28 | 933.17 | | with HST 50. Once the RV 100/HST 50 relative rates are stabilized, and authority to proceed is granted, the RV 100 will descend down the capture axis to a stand-off distance ~1.7 m (for −V1 approach) from the capture target.

The preferred plan for the capture phase is dependent on the state of HST 50 at the time of capture. If HST 50 is not functioning, or non-cooperative, the nominal capture strategy will be as described above, with RV 100 approaching HST 50 along a potentially tumbling capture axis. If HST 50 is functioning and cooperative, the nominal capture strategy will be a traditional approach approximately along the R Bar (from the center of the earth outwards) to HST 50 in an inertial attitude configuration, with HST 50 pointing along the radial direction at the time of capture. This approach is accomplished by performing a sequence of predominantly velocity At the hold point, the RV 100 preferably deploys the GA 108, as shown in FIG. 9, and captures either of the two grapple fixtures 140 located on the −V3 side of HST 50, as shown in FIG. 10. The preferred candidate vehicle control configurations would have HST 50 in an inertial hold (if the PCS system is active) or tumbling, and the RV 100 going to free drift once the GAEE 122 is inside a predefined capture box 142. The capture box 142 defines a set of conditions (position, orientation) within which the GA 108 can capture a grapple target. The GA 108 preferably will be positioned so that a GAEE 122 camera 130 or 132 is centered on the capture box 142. Capture is preferably planned so as to occur during orbit night so the GA 108 lights can be used to control the lighting. Once the command to initiate the final capture sequence has been given, the sequence preferably requires no operator intervention. However, manual override by ground control can always be done if necessary at any point.

In one embodiment, the RV 100 will notify the GA 108 when the grapple fixture 140 enters the specified capture box 142 with the required rates. The on-board vision software can then acquire the target and communicate its status to the RV 100. At that point the attitude control may be turned off to avoid inducing disturbance on the GA 108, and the GA 108 then moves to put the GAEE 122 on the grapple fixture 140, snare the grapple or berthing pin 108, and rigidize. The GA 108 will absorb residual relative vehicle rates. Subsequently, the GA 108 will apply its brakes and the RV 100 will null the combined vehicles rates to achieve a power positive, thermally stable, attitude profile. It may be necessary to maneuver the stack to a −V1 sunpointing attitude to charge the RV 50 batteries prior to berthing.

Once the rates have been nulled, the GA 108 will maneuver the HST 50 to a pre-defined pre-berth position relative to the RV 100. The operator can validate the script to maneuver to the berthing position at the robotics console using script rehearsal software, or can manually maneuver to the berthing position. Preferably, the operator then will bring the HST 50 berthing pins 118 into the capture mechanism on the DM 102 using a combination of scripts and hand controller operations. The operator will then limp the GA 108 joints and allow the capture mechanism to complete the berthing sequence. Initially, the berthing latches preferably are not completely closed. But after a predetermined time to allow the mechanism to equilibrate thermally, the latches may be closed completely. In another embodiment, AI logic on RV 100 can execute the capture/berthing process with or without oversight and/or intervention from a remote operator.

An alternate preferred method of capture is to dock directly to the HST 50 aft bulkhead at the berthing pins using a mechanism(s) on the RV 100. The candidate vehicle control configurations could have HST 50 in an inertial hold (if the PCS system is active) or tumbling at a rate of up to 0.22 deg/sec per axis and the RV 100 remaining in an active control state through capture.

The HST 50 could be in one of several attitude control modes for the RSDM, with the status of the Rate Gyro Assemblies (RGA) being the primary determining factor. If three good RGAs remain, the HST 50 may be conducting normal science operations and the normal attitude control law can be used. In this scenario, science operations will be terminated at the beginning of proximity operations so the HST 50 can be prepared for capture and berthing. The science plan may include breakpoints at one day intervals so that science observations can be extended if proximity operations are delayed. In this case, the HGA booms will be retracted and the aperture door closed.

Given the history of the RGAs, it is quite possible that fewer than three healthy gyros will be available by the RSDM time frame. The HST Project is developing alternate attitude control modes for science that will allow control on two or one gyro(s). Therefore, if one of these modes is in use at the time, the HST could terminate science observations and remain in that control mode, either Magnetometer 2 Gyro (M2G) or Magnetometer 1 Gyro (M1G) mode. If no gyros remain, the HST 50 preferably will be in safemode. However, if inadequate hardware remains on HST 50 to perform an attitude control function, the RV 100 can still perform a capture either with the GA 108 or by direct docking. One of skill in the art will recognize that the above procedure can be modified to accommodate capture and service of three-axis stabilized, spin stabilized, or even satellites with non-functioning or partially disabled attitude control systems.

Figure 23:
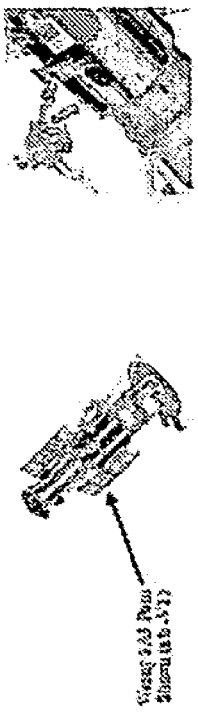
FIG. 23 is a chart summarizing the servicing phase of an embodiment according to the present invention.

Preferably, the servicing phase begins once the RV 100 is completely berthed to the HST 50, or other satellite to be serviced, and terminates when the EM 104 is given the control authority prior to EM 104 ejection. The hardware systems augmentation and science instrument change-outs may occur during this phase. During the servicing phase there preferably are no HST 50 maneuvers required, and thus, in a preferred embodiment, the RV 100 controls the combined vehicle attitude to maintain a power positive, thermally stable profile while accommodating any constraints that are imposed by the replacement instruments or apparatus, called Orbit Replacement Units (ORU). FIG. 23 summarizes the servicing phase.

The preferred servicing tasks are planned to extend the life of HST 50, or other satellite to be serviced, and may provide enhanced science or other operational capabilities. To achieve these objectives the RS 106 carries out a series of tasks, as described hereafter. Preferably, any new hardware to be installed on HST 50 by the RS 106 is equipped with robot-friendly interfaces that allow the ORU Tool Change-out Mechanism (OTCM) 138 end effecter to directly grasp and handle the ORU, including the new science instruments to be installed and interfaces on the RV 100 to be actuated by the DR 120. However, the HST 50 or other satellite to be serviced may not be equipped with the necessary handling interfaces for the DR 120 to manipulate it directly. To address this problem, a preferred suite of specialized tools (not shown) has been developed to create the environment necessary for the RS 120 to carry out the servicing tasks on HST. One skilled in the art will recognize that other specialized tools could be used in conjunction with the servicing of other satellites that would still fall within the purview of this invention. In one embodiment, the tools for use with the HST 50 include devices to open the aft shroud, the radial bay, and bay doors; tools to actuate the latches to release the science instruments and remove these instruments from HST 50; and tools to mate and de-mate connectors, actuate bolts, and the like.

In addition to appropriate tools for the DR 120, successful completion of the preferred servicing objectives may require that the remote operators receive visual confirmation of the tasks being performed. Therefore, a vision system comprising multiple cameras with various functions and specifications may be used to provide views of on board activities. In one embodiment, the preferred vision system, already described above, is integrated with the DR 120, GA 108, EM 104 and servicing tools.

One skilled in the art will understand that due to the potential for damage to detectors and thermal degradation of adhesives, the science instruments, and the open cavities in which they are mounted, preferably are protected from direct sun exposure. In one embodiment, the combination of shading from the EM 104 solar arrays, vehicle attitude, and robot positioning, meets the sun protection requirements. In addition, the translation paths taken by the RS 106 when moving instruments preferably will be bounded based on both sun protection and thermal constraints.

According to one embodiment, prior to using the DR 120 for servicing, the GA 108 retrieves the DR 120 from the EM 104. The remote team then initiates a series of procedures to verify the performance of the DR 120 and the total RS 106 system. Preferably, the GA 108, and the DR 120 arms, 134 and 136, are moved sequentially. In one embodiment, the RS 106 control system does not allow simultaneous motion of any arms 108, 134 or 136. However, one skilled in the art will see that such simultaneous motion, and other types of synchronized motion, are contemplated by this invention and fall within its scope. Thus, according to one preferred embodiment, in order to move one of the arms GA 108, 134 or 136, motor power is disabled for the other two. In this embodiment, removing motor power engages the brakes for that motor. Also, the command for putting on the brakes can be part of a script, or can be a single command issued from the remote operator, or can be part of an electrical or electromechanical interlock that automatically engages to prevent simultaneous motion of two or more of the arms GA 108, 134 or 136.

As indicated below, two tests preferably are carried out on the DR 120 to verify readiness, include the following steps.

DR Aliveness Test
  Once the GA 108 and the DR 120 are mated, heater power is applied to the DR 120 until it reaches operating temperature. This can be verified via EM 104 bay temperature telemetry.
  The DR 120 VCUs are powered and the flight software is loaded into the DR 120 flight computers.
  Communication between the DR 120 computers and the VCUs is verified.

hardware to test the inverse kinematics and singularity avoidance software. Verification is accomplished via joint angle telemetry and streaming video feeds.

Two performance tests are executed to verify the transient response of the DR 120 arms 134 and 136 in several poses and modes. Various disturbances are introduced and arm performance is verified via camera views and joint angle sensors. The first test, summarized in Table 10 below, is the DR transient response test. Each test category is repeated with the opposite DR 120 arm stabilized and free. The second performance test, summarized in Table 11 below, verifies GA 108 transient response while mated to the DR 120.

The OTCM 138 cameras are calibrated using a calibration fixture on the task board. The DR 120 arms 134 and 136 then translate to the high hover position directly over the calibration fixture. Still images are downlinked and compared to expected image fidelity.

TABLE 10

| Test Category | Arm Pose | DR Arm Mode | Disturbance Input | Objective |
|---|---|---|---|---|
| 1 | Various elbow joint angles (outstretched, right angle, folded up) | Position Hold | Fire Thruster | Damping, |
| 2 | | Brakes Engaged | Fire Thruster | natural frequency, |
| 3 | | Position hold | Arm slew (in free drift) | link flexibility, joint flexibility. |
| 4 | Stretched Out | Brakes Engaged | Fast arm slew (in free drift) | Stopping Distance |
| 5 | Various approaches to Task Board. | Tele-operated. | Small arm slew (in free drift) | Positioning resolution, ergonomics |

TABLE 11

| Test Category | GA Arm Pose | GA Arm Mode | Disturbance Input | Objective |
|---|---|---|---|---|
| 1 | Two nominal servicing configurations: One at EM, other at HST | Position Hold | Fire Thruster | Damping, |
| 2 | | Brakes Engaged | Fire Thruster | natural frequency, |
| 3 | | Position hold | Arm slew (in free drift) | link flexibility, joint flexibility. |
| 4 | Stretched Out | Brakes Engaged | Fast arm slew (in free drift) | Stopping Distance |
| 5 | Various approaches to HST Bay. | Tele-operated. | Small arm slew (in free drift) | Positioning resolution, ergonomics |

All DR 120 joints are verified by issuing commands for small, benign movements to each joint against the DR 120 launch locks.
  The DR 120 down-locks are released and the DR 120 is retracted by the GA 108 from the EM 104 and moved to a hover position away from the structure.

DR Functional Test
  A VCU test verifies the use of each DR 120 camera in still and streaming mode, as applicable. All DR 120 cameras 130 and 132 are tested in both still and streaming mode. In addition, all DR 120 light sources are tested, which ensure proper video and still photo capabilities for both teleoperation and supervised autonomy.
  The joint range of motion is verified by commanding each joint through the widest practical range and polarity.
  The dexterous motion of the DR 120 is verified by moving to several preplanned locations that are away from any Once the OTCM 138 cameras are calibrated, a test of the Object Recognition and Pose Estimation (ORPE) system can be done. Preferably, a DR 120 arm 134 or 136 translates to a hover position directly over the task board test area. A stereo pair of images is taken by the calibrated and synchronized OTCM 138 cameras, and these images are then downlinked, and the OTCM offset from the calibration fixture is calculated. A command is then sent to correct the arm position for the offset. Once camera calibration is complete, the DR 120 is commanded to move by a predetermined amount, and the ORPE process is repeated to ensure ORPE functionality. Other tests that optionally may be done at this time include a force moment accommodation test (to compensate for forces and moments placed on the DR 120 when transporting tools and instruments during a task), an OTCM torquer test (to verify the running torque profile of the OTCM torque drive), and an OTCM umbilical connector checkout (to power payloads in its grasp via an umbilical connector)

The preferred RS 106 motion might be categorized into two distinct types: constrained movement and free-space movement. Constrained motion is defined as any task that occurs in close proximity to other structures, including the EM 104, DM 102 and HST 50. Free-space motion is movement that takes place away from a structure, such as the movement of the RS 106 from one worksite location to another, or the movement of the DR 120 to a grapple fixture hover position. Preferably, the delineation between constrained and free-space motion is based on the maximum braking distances of the GA 108 and DR120.

Free-space motion is preferably done using supervised autonomy (described in more detail below). In this embodiment, GA 108 translations between the EM 104 and the HST 50 preferably are considered free-space motions. Other examples might include visual surveys and coarse positioning. In one embodiment, visual surveys will be required the first time the DR 120 visits a new site or when the DR 120 returns to the worksite after a significant absence. These return visual surveys are intended to be a quick visual check of the area with the purpose of verifying that there has been no change to the worksite. The visual surveys in general may be accomplished using any of the robot cameras, depending on the size of the area to be surveyed and lighting conditions.

Figure 24:
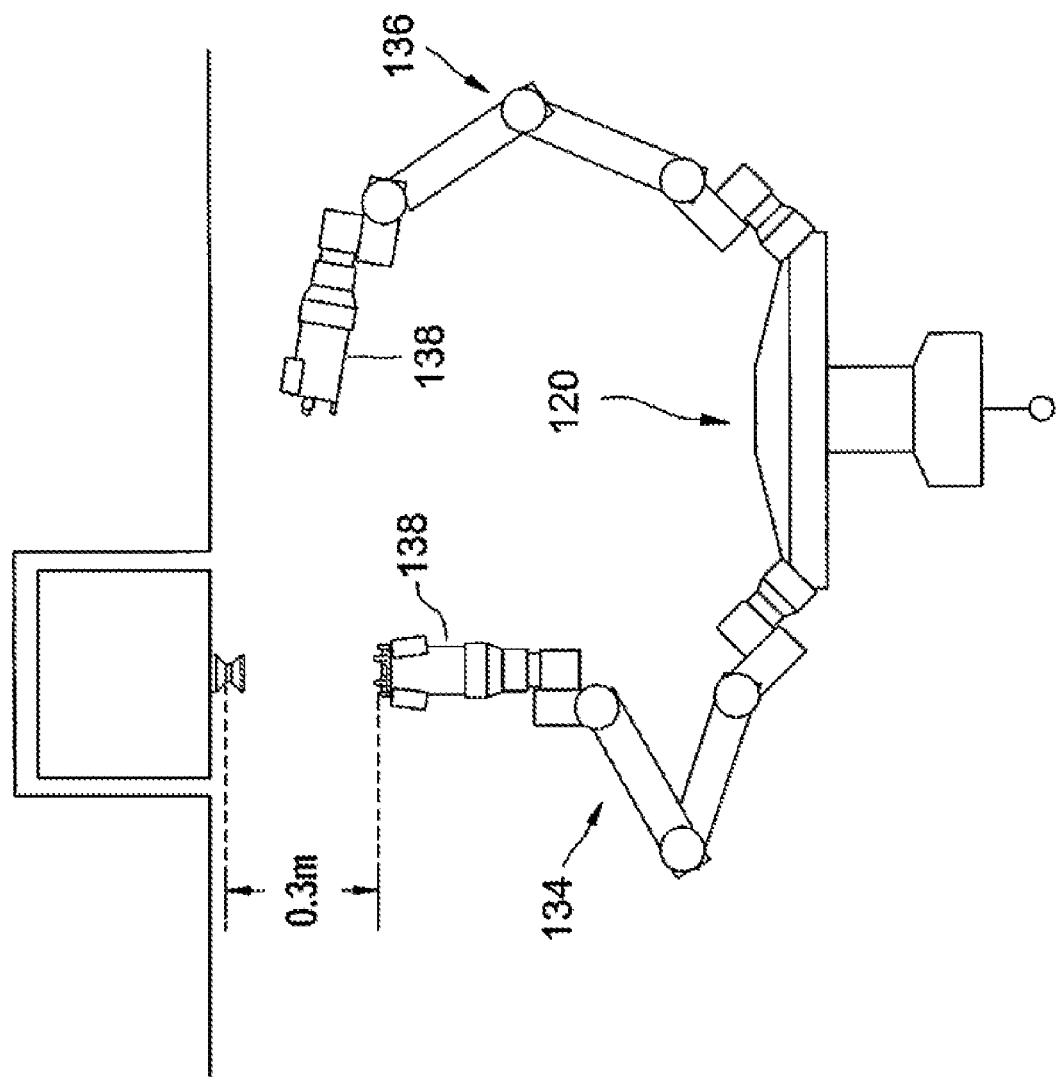
FIG. 24 is a top view of the DR shown after coarse positioning is complete.

In another embodiment, coarse positioning is described as a series of maneuvers to position the RS 108 for a task. The goal is to position one DR 120 end effecter approximately 30 cm from the intended interface, such as a micro-fixture, while the other DR 120 end effecter is positioned to obtain the necessary orthogonal camera views. FIG. 24 illustrates typical arm positioning after completion of coarse positioning. Preferably, this pose, at a distance of about 30 cm, is called a "high hover" position.

Constrained motion, according to one embodiment, is done using a combination of supervised autonomy and teleoperation, depending on the task interface (described hereafter). Fine positioning, contact operations and Object Recognition/ Pose Estimation (ORPE) are all examples of constrained motion. Once the arms are sited using coarse positioning, ORPE can be used to account for any misalignment that may exist between the end effector and the micro-fixture before contact is attempted. Preferably, arm motion is halted until this alignment is computed.

As one skilled in the art will realize, the fluidity of operations in manual mode is dependent on the latency of the system, which can be defined as the time from when the command to move is issued from the remote operator via a hand controller until the operator receives verification of the motion via video. The RV 100 on orbit and remote segments preferably are designed to minimize this latency and also to minimize variations in latency. According to one embodiment, this transmission latency is about two seconds.

Supervised autonomy as it applies to the RS 106, is defined as the process of allowing the RS 106 to execute a sequence of instructions without intervention from the remote operator. Preferably, these instructions are packaged in a script that is generated remotely, and is uplinked to the RS 106 for execution upon ground command giving authority to proceed. Alternately, RS 106 may execute a series of operations based on AI logic that may be preprogrammed into RS 106 prior to launch or uplinks or updated once RS 106 in orbit. The remote operator maintains the ability to abort a script or AI initiated operation at any time.

In one embodiment, two remote operators work in tandem as an operator/co-operator team to "teleoperate" (manually control from afar) the RS 106. Preferably, during tasks using supervised autonomy, both operators will monitor script/AI execution and resulting RS 106 motion. During teleoperation, or manual operation, the RS 106 primary operator preferably controls the GA 108 and both DR 106 arms 134 and 136 in sequence as required for a servicing task. The other operator preferably supports the primary RS 106 controller by navigating through the servicing procedures, helping to coordinate camera views, inspecting the worksite during a task, and so forth. One of skill in the art will recognize that the above division of labor between two operators and that a different division of tasks, completion of all tasks by one operator, or the use of more than two operators are all contemplated by the present invention and fall within its scope. Tele-operation is explained in greater detail hereafter.

Figure 25:
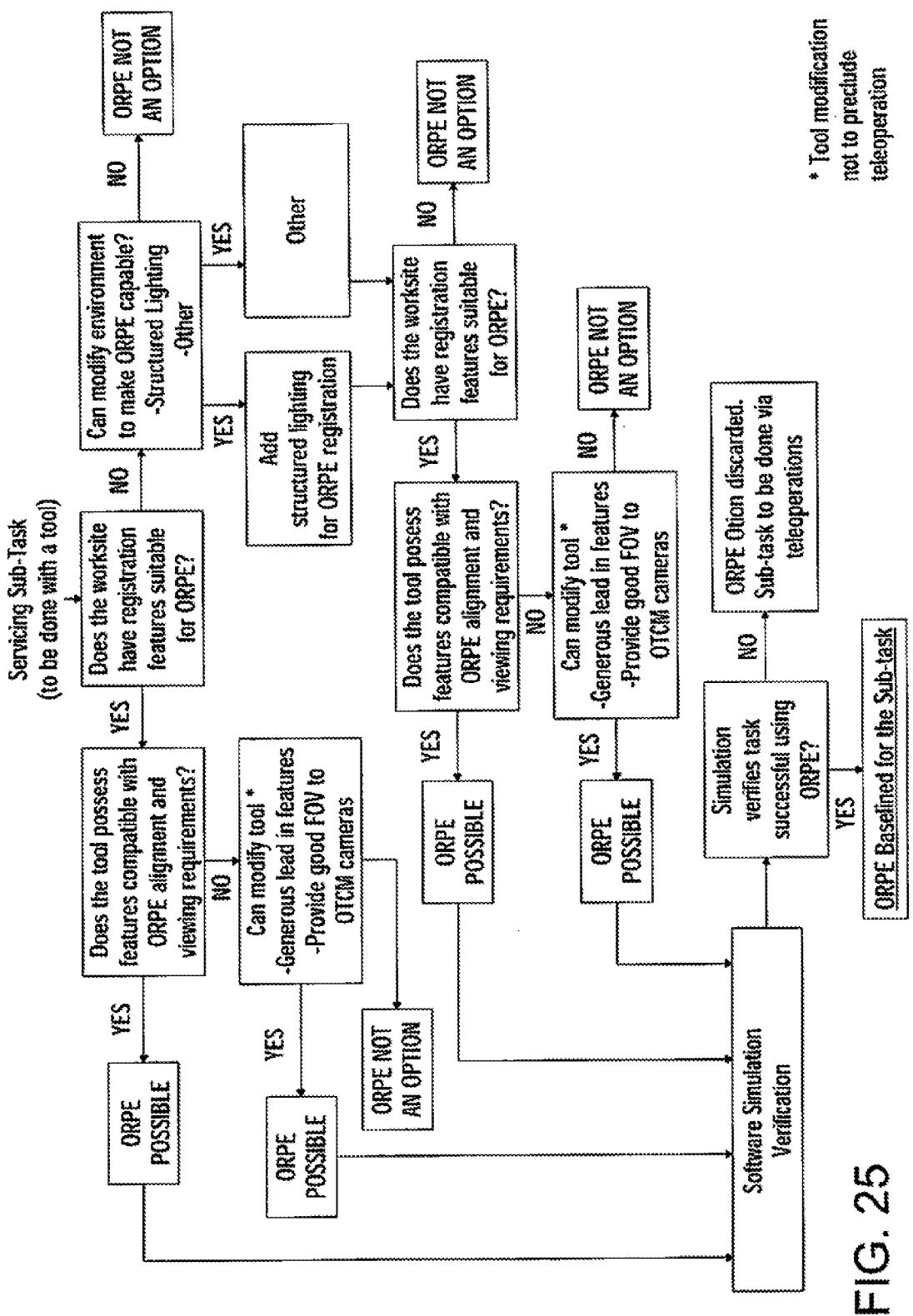
FIG. 25 is a schematic representation of a decision tree for determining whether a task is "robot-friendly."

It is preferred that supervised autonomy will be used for free-space motions. It is also preferably used for constrained motions when the target interface is robot-friendly, that is, when it is equipped with a fixture and a target designed for robot operations. Examples of robot-friendly operation include removing/returning tools from/to caddies, handling RV 100 hardware, and interfacing with HST 50 when tool design allows for self alignment onto the HST 50 interface without the use of robot-friendly targets, such as clamping a tool onto an HST handrail. A preferred decision tree for determining which tasks are not robot-friendly, and therefore done by teleoperation, is provided in FIG. 25.

Supervised autonomy, according to one embodiment, relies on the ability to correlate RS 106 motion with an environment model at the remote station. This is done through the use of Object Recognition/Pose Estimation (ORPE), which is described as the process of detecting errors in and correcting the remote model upon which scripted commands are based. Preferably, after the RS 106 reaches the high hover position over a target area (about 30 cm), three sets of stereo images are taken with the cameras. These images are then downlinked to the remote station, preferably uncompressed (10 Mb for each set). Once the images are at the remote station, a team of image analysts studies the current position and orientation with respect to the target, and compares this with the expected model in the remote system software. This visual comparison shows any misalignment between the arm's coordinate frame and the target fixture coordinate frame.

Figure 26A:
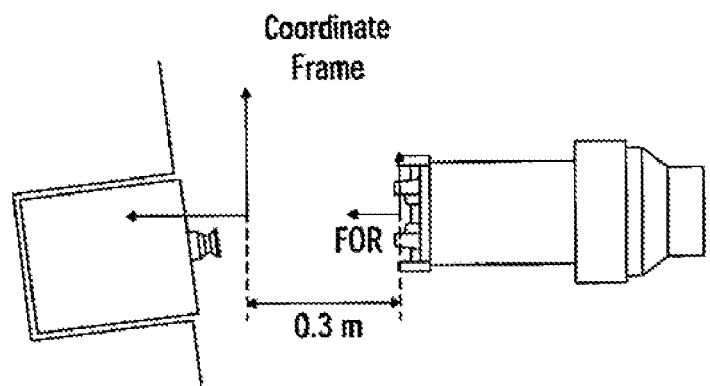
FIG. 26A is a side view of one end of a DR arm and a proposed target, illustrating the coordinate frames before calibration.
Figure 26B:
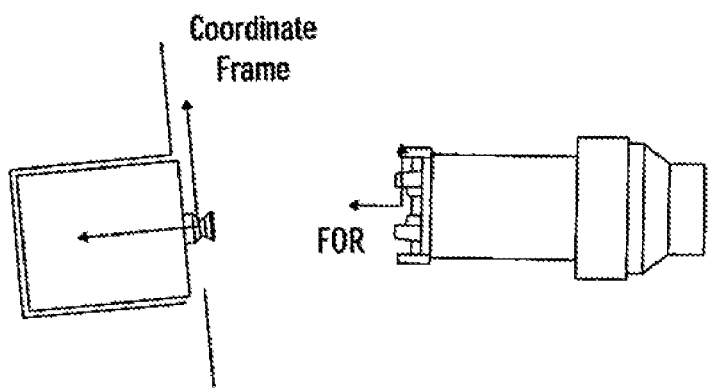
FIG. 26B is a side view of one end of a DR arm and a proposed target, illustrating the coordinate frames after calibration.
Figure 26C:
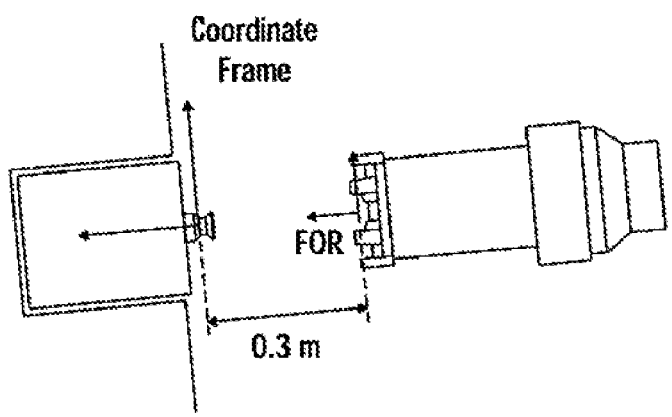
FIG. 26C is a side view of one end of a DR arm and a proposed target, illustrating the end of the arm in a hover position after correction.

According to one embodiment, if a misalignment is detected, a pose estimate is applied to the target coordinate frame via a transformation matrix. The new pose estimation for the robot is transmitted to the virtual environment software, which updates the target coordinate frame within the model. This updated model is then placed on the server at the remote station and a notification is sent to all remote workstations that a model correction has been made. Personnel at each workstation must acknowledge the change. Then a correction script is generated based on the new model. Before the script can be uplinked, it must be validated against the new model version number. Any attempt to validate a script with an old model will be rejected by the remote system software, thus allowing for an extra check of the model. Once the script is validated, it is loaded to the spacecraft and executed. FIGS. 26A, 26B and 26C illustrate the alignment before and after the correction is applied. One of skill in the art will recognize that it also is possible to perform that above model correction using processing on board RS 106. In one embodiment, the environmental model is stored on the RS 106 and the correlation of RS 106 motion with that model may be automatically initiated by an on board processor based on a command from the remote station, a preloaded script, or AI logic resident in the on board processor.

The arm then preferably moves to a new hover position in alignment with the target and the task continues. In accordance with this embodiment, if the position and/or orientation errors detected by ORPE are unexpectedly large, a script simulation, or rehearsal, may be required at the remote station prior to uplink. If the errors are determined on board RS 106, the on board processor can run a simulated rehearsal or notify the ground operator of the need to perform a script simulation at the remote station.

One preferred ORPE process can take anywhere from 10 to 15 minutes, depending on image quality and the amount of correction needed. One skilled in the art will understand that lighting is important for ORPE to function properly. Thus, the preferred lighting system used to illuminate the worksites is optimized to provide sharp contrasts that create the ideal images for used by ORPE software.

As indicated earlier, a preferred RS 106 can also be operated via manual control, also called teleoperation. An operator at a remote location monitors the environment via video downlink and moves the RS 106 preferably using joystick control. Deflection of the hand controllers directly results in RS 106 movement.

This mode of operational control can be used as an alternative to supervised autonomy for a given task and is the preferred primary method for positioning the DR 106 when the interface being engaged is not designed for robot use, as, for example, in the case of installation of handling tools on the science instruments for removal from HST 50. In one embodiment, two hand controllers located on the remote control station are used to move the arms via rate commands, meaning that the amount of controller deflection equates to how fast the arm moves. Moreover, these commands can be scalable so the same amount of deflection of the controllers can generate large motion if the arms are far from structure, or small motion if the task being carried out requires very fine positioning. During teleoperations, the operator preferably relies primarily on streaming video from a variety of cameras, including the arm's cameras, to detect misalignments and position the DR 106 or a tool in the correct location.

Therefore, teleoperator commands are preferably verified visually. Whenever possible or practical the arm 134 and 136 cameras will offer an orthogonal view of the interface to be grasped, while cameras located on the DR 106 body provide situational awareness views of the worksite. Preferably, camera switching will be done via a voice-loop request from the teleoperators at the remote station to camera operators at a separate vision system workstation. In a preferred embodiment, the switch between scripted and manual modes can be carried out quickly and easily by commanding a mode change to the RS 106 avionics and configuring the remote station for commanding via the hand controllers.

One skilled in the art will appreciate that the servicing tasks are preferably choreographed such that they can be carried out using only one DR 106 arm 134 or 136, thereby allowing the other arm to serve as a stabilization point at a worksite (using appropriate stabilization interfaces). One embodiment makes use of this feature for servicing tasks where the dynamics of the system cause 1) inadequate positioning resolution with respect to task alignment requirements, 2) excessive overshoot during positioning or stored energy release with respect to access envelopes, 3) excessive settling time with respect to allocated task durations, or 4) excessive system deflection when force is applied with respect to task alignment requirements. The use of stabilization in this embodiment may decrease task completion times in some cases.

For each servicing task, a number of tools may be required to interface with HST 50, or other satellite serviced, to overcome the fact that the satellite may not be equipped with robot-friendly interfaces. For example, in one embodiment, tools are used to open HST's aft shroud and radial bay doors, de-mate and mate connectors, and drive instrument latches. These tools preferably are stowed on the EM 104 in stowage compartments, although it will be recognized that tools could also be stowed on the DM 102. Tools needed for each servicing task are preferably grouped together and placed onto a caddy prior to launch. For example, the tools needed to open the aft shroud doors are all located on one caddy, and the tools needed to carry out the servicing tasks on instruments are in another caddy. One preferred tool caddy includes a plate upon which the tools are attached with release mechanisms and targets that allow for easy removal and replacement of tools by the DR 120. These caddies save time because the RS 106 does not need to travel back and forth to the EM 104 to retrieve tools. Instead, as part of the setup for a servicing task, the RS 106 removes the entire caddy from its stowage location on the EM 104, transports the caddy to HST 50, and mounts it onto the worksite preferably using a Foot Restraint (FR) socket. Tools can be used multiple times during servicing and hence each tool can be easily located by the DR 120 cameras through the use of visual targets and released from the caddy or replaced by incorporating micro-fixtures into their design.

In one preferred embodiment, certain servicing activities can continue through a loss of communications (command and telemetry) between the remote station and the RV 100. For example, during a TDRS Zone of Exclusion (ZOE), where no TDRS satellite is in sight, operations can be planned accordingly. Thus, approaching a ZOE, a scripted command can be sent with the resulting task continuing through the ZOE. Alternately, AI logic on board RV 100 or any of its components can continue to initiate tasks autonomously through the ZOE. Preferably, the AI logic can be preprogrammed with a plurality of safety criteria that must be met before initiating particular autonomous tasks. In one embodiment, one set of safety criteria can be established to govern autonomous action when communications are available, i.e. supervised autonomy, and a second, preferably more stringent, set of safety criteria may be established for autonomous actions when communications are not available, i.e. unsupervised autonomy.

In the event of a temporary loss of signal (LOS), teleoperated arm movements will stop immediately with a loss of commanding. Supervised autonomous movements on the other hand have the capability to be scripted to either continue through the LOS, as with a ZOE, or stop immediately, depending on the task. Scripted activities are preferably evaluated on a case by case basis to determine the level of risk associated with the completion of the activities while there are no remote communications. In either scenario, the robot reports to the remote station upon retrieval of signal.

In one preferred embodiment, after the servicing is concluded and before the EM 104 separates from the DM 102, the serviced satellite may be boosted to a higher orbit if its orbit has deteriorated significantly. Reboost, in this case, would preferably be performed using the EM 104 propulsion system. In another embodiment, the satellite being serviced may be refueled by the EM 104 prior to separation to further extend the satellite's useful life.

The EM 104 ejection and disposal phase begins, according to one embodiment, when control authority is handed over from the DM 102 to the EM 104 and ends when controlled disposal repositioning of the EM 104 is complete. Alternately, the EM 104 may be separated from DM 102 and either (1) directed to a second satellite requiring de-orbiting/servicing; or (2) placed in a parking orbit to await instructions to proceed to a second satellite, optionally waiting serving as an on orbit repair facility to enable rapid return to service upon unexpected failure of a satellite or key component thereon.

Figure 27:
FIG. 27 is a chart summarizing the ejection and disposal phase of an embodiment according to the present invention.
Figure 28A:
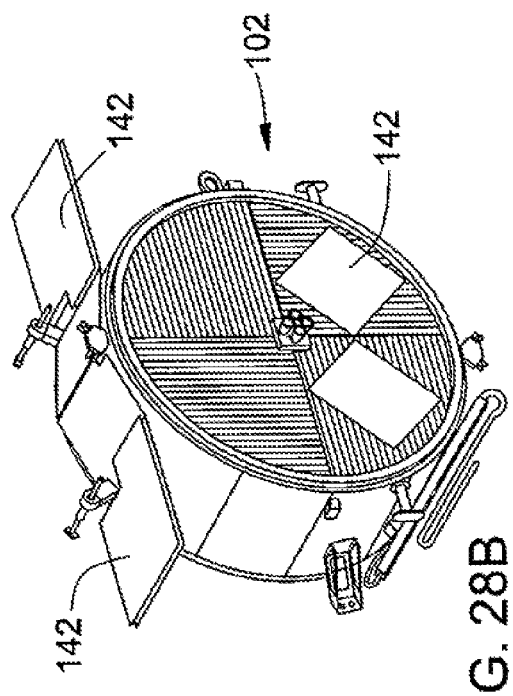
FIGS. 28A through 28D are three-dimensional perspective views of the DM illustrating sequential deployment of its solar arrays after separation of the EM.
Figure 28B:
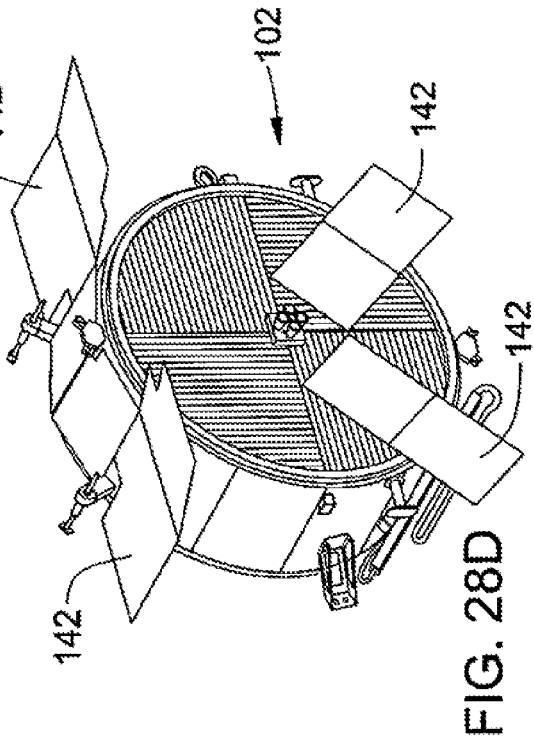
Figure 28C:
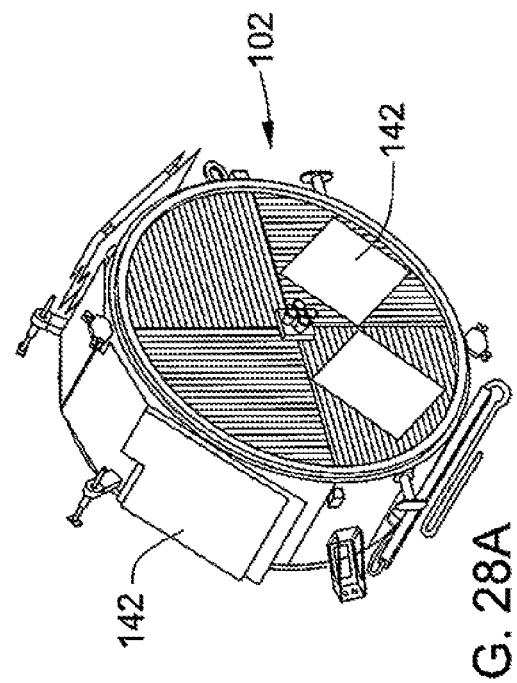
Figure 28D:
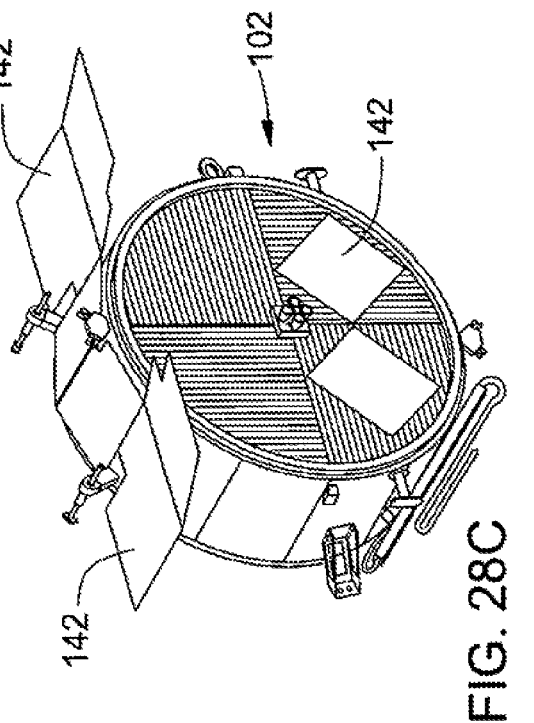

FIG. 27 summarizes one embodiment of the EM 104 ejection and disposal phase. One embodiment of the sequence is as follows:

1. EM 104 ejection from the RV 100: After the RV 100 is slewed to the proper attitude, release pyrotechnics are fired to liberate the clamp band between the DM 102 and EM 104. Preferably, springs create a relative separation velocity between the EM 104 and the DM 102/HST 50 stack sufficient to ensure that there is no re-contact during the time required for initial EM 104 attitude determination and stabilization. One embodiment releases the EM 104 directed along the negative orbit velocity vector. Post-ejection, the EM 104 nulls its own tip-off rates while the HST 50 nulls the tip-off rates of the DM 102/HST 50 stack. The EM 104 then performs two zenith-directed burns of the thrusters followed by a negative orbit velocity vector burn. Other separation mechanisms and methods known to those of skill in the art may be used without departing from the scope of the present invention. If EM 104 is to be placed in a parking orbit or transit directly to a second satellite in need of repair, EM 104 may be boosted into that parking orbit or an intercept trajectory to the second satellite following separation from the DM 102/HST 50 stack.
2. EM 104 mass properties measurement: When the EM 104 is safely in a non-interfering orbit with respect to HST 50, the EM 104 preferably will perform a series of RCS thruster firings in order to determine its mass, center of mass, and moments of inertia, and update the appropriate table. Remote station control may verify proper operation. If EM 104 is to be immediately de-orbited, steps 3 and 4 below may be executed. If EM 104 is to be placed in a parking orbit for later servicing mission(s) for one or more additional satellites, steps 3 and 4 may be performed at the conclusion the last servicing rendezvous for EM 104.
3. De-orbit burn #1: At the appropriate point in the orbit to place perigee (accounting for perturbations) for the final disposal burn, the EM 104 will fire its four 100-pound thrusters for sufficient time to produce a predetermined delta V, dropping perigee to 250 km. This perigee is high enough to avoid attitude control issues associated with center-of-mass/center-of-pressure offsets. It is also high enough to allow the EM 104 to remain in orbit long enough to recover from any anomalous condition.
4. De-orbit burn #2: At least 3 orbits later (after sufficient time to confirm a nominal burn #1), the EM 104 will fire its four 100-pound thrusters for sufficient time to result in perigee below 50 km. There will be two consecutive orbits during which burn #2 can be executed, with additional pairs of opportunities each day.

The entire sequence described above is preferably autonomous, with the remote operator continuously monitoring performance and providing go-aheads before burns #1 and #2. Any anomalies detected on board preferably result in an abort of the sequence, except during de-orbit burn #2, where a point of no return is reached. The remote operator can abort the sequence at any time prior to de-orbit burn #2 via a command or EM 104 can be set automatically to abort the sequence if an anomaly is detected.

Preferably, after the EM 104 is clear of the HST 50/DM 102 stack, the DM 102 solar arrays 142 are deployed. FIG. 28 graphically depicts this process. The preferred science operations phase begins at the completion of EM 104 ejection and terminates when science observations and any end-of-life testing is complete. According one embodiment, after the EM 104 has been jettisoned the HST 50 is commanded from the remote station to reconfigure for science operations. This includes establishing attitude control, deploying the HGA booms 56, opening the aperture door 58, and so forth. One of skill in the art will recognize that, following servicing, the satellite will undergo a plurality of processes to resume its normal post-service operations, which may include establishing or restoring attitude control, communications links, C&DH, thermal control, and payload operations on the satellite. The particular sequence of post servicing operations will vary depending on the configuration and payload of the satellite as well as its condition when servicing was commenced.

In another embodiment, the HST science operations will resume with the initiation of the Servicing Mission Verification Program (SMOV). The SMOV for the preferred servicing mission has been established to verify the functions of the HST 50 replacement instruments. It also includes the re-commissioning of the existing science instruments, spacecraft subsystems, and the overall observatory for science operations. FIG. 29 summarizes the science operations phase.

Due to the extended timeframe of the method of one embodiment, the on-orbit activities of the SMOV program can be grouped for execution in two phases, thereby mitigating some of the HST observing time lost due to a lengthy servicing mission. Preferably, activities in SMOV Phase A are those that can be carried out while the EM 104 is still attached to the HST 50. Activities executed during Phase A will complement the individual hardware elements performance verification (FT of battery and gyro augmentations, and instruments). These may include, but not be limited to, engineering activation of old and new science instruments, monitoring their contamination and thermal properties, and characterizing their baseline performance. Wherever possible, science calibrations (internal and external) are performed. Also, if at all possible, science programs can be carried out during servicing, subject to the constraints imposed by the servicing mission and pending the commissioning of prerequisite capabilities. All activities performed during Phase A will not be sensitive to and will not interfere with the temporary spacecraft configuration and the established servicing mission timeline.

Figure 30:
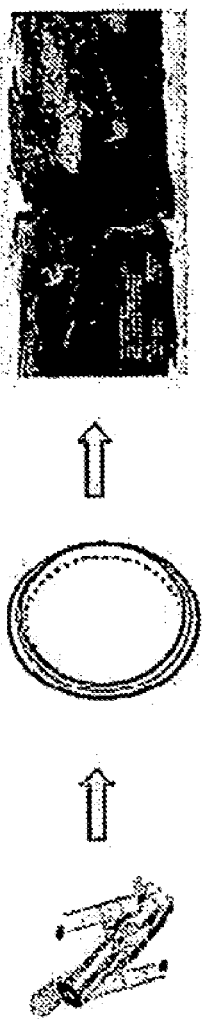
FIG. 30 is a chart summarizing the HST/DM disposal or de-orbiting phase of an embodiment according to the present invention.

SMOV Phase B preferably comprises those commissioning activities that can be carried out only after completion of the servicing mission and the release of the EM 104, with the spacecraft in final on-orbit configuration. Thus, in one embodiment, commissioning of all other science instruments and spacecraft subsystems not performed during Phase A will be accomplished in Phase B. This may include spacecraft power, pointing, thermal, and guidance, as well as existing and replacement scientific instrument characterization and calibration. Hence, science observations preferably ramp up to their normal levels as SMOV Phase B activities ramp down to completion. The HST 50/DM 102 disposal phase preferably begins at the completion of science operations and terminates with the completion of the controlled disposal. FIG. 30 summarizes this phase.

Preferably the DM 102 slews the combined vehicle to the preferred attitude for the initial reentry burn. According to this embodiment, a small retrograde burn (engineering burn) to check out the system is initiated followed by two retrograde apogee burns. Then the final burn adjusts the perigee to 50 km and sets up the preferred controlled reentry into the Pacific Ocean.

While the invention herein revealed and described is set forth in what, at present, is considered to be the best mode contemplated for making and carrying out the invention and the preferred embodiments of this invention, it will be understood that the foregoing is given by way of illustration, rather than by way of limitation. Accordingly, any and all boundaries and restrictions imputed to the scope of this invention must be defined by the spirit and intent of the following claims.

The invention claimed is:

1. A servicing vehicle for servicing other free-flying spacecraft, comprising:
    a de-orbit module, and
    an ejection module including a robot system for servicing the spacecraft, the robot system having
        a grappling arm, and
        at least one dexterous arm,
    wherein the robot system is autonomously controlled by commands that are subject to override by a remote operator in telecommunication with the servicing vehicle.

2. A servicing vehicle for servicing other free-flying spacecraft, according to the limitations of claim 1, wherein the ejection module further comprises stowage area for storing the robot system.

3. A servicing vehicle for servicing other free-flying spacecraft, according to the limitations of claim 1, wherein the de-orbit module includes stowage area for tools, parts and instruments needed in servicing the spacecraft.

4. A servicing vehicle for servicing other free-flying spacecraft, according to the limitations of claim 1, wherein the de-orbit module includes:
    relative and absolute navigation sensors for determining absolute servicing vehicle attitude and relative attitude between the servicing vehicle and the other spacecraft,
    guidance, navigation and control system actuators,
    thrusters, and
    momentum management devices.

5. A servicing vehicle for servicing other free-flying spacecraft, according to the limitations of claim 1, wherein the ejection module further includes stowage area for tools, parts and instruments needed in servicing the spacecraft.

6. A servicing vehicle for servicing other free-flying spacecraft, according to the limitations of claim 1, wherein the grappling arm is used to capture the other free-flying spacecraft.

7. A servicing vehicle for servicing other free-flying spacecraft, according to the limitations of claim 1, wherein the de-orbit module and the ejection module are separable.

8. A servicing vehicle for servicing other free-flying spacecraft, according to the limitations of claim 1, wherein the robot system is used to carry out servicing tasks.

9. A servicing vehicle for servicing other free-flying spacecraft, according to the limitations of claim 8, wherein the servicing tasks include replacing degraded batteries with new batteries.

10. A servicing vehicle for servicing other free-flying spacecraft, according to the limitations of claim 8, wherein the servicing tasks include replacing existing scientific instruments with new scientific instruments.

* * * * *